(12) United States Patent
Hakkaku et al.

(10) Patent No.: US 11,491,704 B2
(45) Date of Patent: Nov. 8, 2022

(54) METHOD FOR FORMING 3D OBJECT

(71) Applicant: MIMAKI ENGINEERING CO., LTD., Nagano (JP)

(72) Inventors: Kunio Hakkaku, Nagano (JP); Kazuhiro Ochi, Nagano (JP); Masakatsu Okawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/702,558

(22) Filed: Dec. 4, 2019

(65) Prior Publication Data
US 2020/0101713 A1 Apr. 2, 2020

Related U.S. Application Data

(63) Continuation of application No. 15/494,556, filed on Apr. 24, 2017, now abandoned.

(30) Foreign Application Priority Data

Apr. 27, 2016 (JP) .............................. JP2016-089263

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B33Y 10/00* (2014.12);
(Continued)

(58) Field of Classification Search
CPC ......... B33Y 10/00; B33Y 30/00; B33Y 50/02; B29C 64/112; B29C 64/209;
(Continued)

(56) References Cited

U.S. PATENT DOCUMENTS

| | | | |
|---|---|---|---|
| 2010/0191360 A1* | 7/2010 | Napadensky | B29C 64/40 700/98 |
| 2012/0141698 A1* | 6/2012 | OLeary | D06Q 1/10 428/32.77 |

(Continued)

FOREIGN PATENT DOCUMENTS

| | | | | |
|---|---|---|---|---|
| JP | 2015217670 | 12/2015 | | |
| JP | 2015217670 A | * 12/2015 | | B33Y 30/00 |

(Continued)

OTHER PUBLICATIONS

"Office Action of Japan Counterpart Application", dated Jun. 8, 2021, with English translation thereof, p. 1-p. 7.

*Primary Examiner* — Jacob T Minskey
*Assistant Examiner* — Caroline Beha
(74) *Attorney, Agent, or Firm* — JCIPRNET

(57) ABSTRACT

A forming device that forms a 3D object includes a head section including a plurality of nozzle rows, and a scanning driving section that causes the head section to carry out a scanning operation; where the head section includes a first nozzle row group, a second nozzle row group, and a support nozzle row group; in an operation of at least one of the forming modes, the forming device forms at least one part of the 3D object using the first nozzle row group and the second nozzle row group and forms a support layer in a periphery of the 3D object; and when a maximum value of a material dischargeable in unit time in one scanning operation is defined as a material discharging ability, the material discharging ability of the support nozzle row group is greater than the material discharging ability of the first nozzle row group.

13 Claims, 10 Drawing Sheets

(51) Int. Cl.
  *B33Y 10/00*  (2015.01)
  *B33Y 50/02*  (2015.01)
  *B29K 105/00* (2006.01)
  *B33Y 30/00*  (2015.01)

(52) U.S. Cl.
  CPC .............. *B33Y 30/00* (2014.12); *B33Y 50/02* (2014.12); *B29K 2105/0058* (2013.01); *B29K 2995/002* (2013.01); *B29K 2995/0026* (2013.01)

(58) Field of Classification Search
  CPC ...... B29K 2105/0058; B29K 2995/002; B29K 2995/0026
  See application file for complete search history.

(56) References Cited

U.S. PATENT DOCUMENTS

| | | | |
|---|---|---|---|
| 2014/0110872 A1* | 4/2014 | Levy ................. | B33Y 50/02 264/40.1 |
| 2015/0091217 A1* | 4/2015 | Araki ................. | B29C 37/0032 264/447 |
| 2015/0224717 A1* | 8/2015 | Kritchman .......... | B41M 7/0027 700/119 |

FOREIGN PATENT DOCUMENTS

| | | |
|---|---|---|
| JP | 2016016553   | 2/2016 |
| JP | 2016016553 A * | 2/2016 |

* cited by examiner

Y direction continuous

X direction continuous

Two-dimensional dispersion with four heads

Two-dimensional dispersion with five heads

Monochromatic 3D object of light green color

METHOD FOR FORMING 3D OBJECT

CROSS REFERENCE TO RELATED APPLICATIONS

This application is a continuation application of and claims the priority benefit of a prior application Ser. No. 15/494,556, filed on Apr. 24, 2017. The prior application Ser. No. 15/494,556 claims the priority benefit of Japanese Patent Application No. 2016-089263, filed on Apr. 27, 2016. The entirety of the above-mentioned patent application is hereby incorporated by reference herein and made a part of this specification.

TECHNICAL FIELD

The present disclosure relates to a forming device and a forming method.

DESCRIPTION OF THE BACKGROUND ART

In recent years, development of a forming device (3D forming device) that forms a stereoscopic 3D object is advancing. A configuration in which forming can be carried out in various forming modes has been proposed for a configuration of a forming device, see Patent Document 1.

[Patent Document 1] Japanese Unexamined Patent Publication No. 2016-26915

SUMMARY

When forming a 3D object with a forming device, for example, the forming is carried out through a stacking forming method of sequentially stacking a plurality of layers. In such a case, each layer to be stacked is formed by discharging a forming material using an ink jet head, and the like.

In such a case, however, a great number of layers needs to be formed in an overlapping manner, and thus the forming usually requires a long time. More specifically, when carrying out the forming with a conventional forming device, a forming speed in a direction (stacking direction) of overlapping the layers is, for example, about one to two cm/h. Thus, when attempting to form a 3D object having a height of about 10 cm, for example, a time of about half a day is required.

On the contrary, the forming speed can be increased by, for example, increasing the number of ink jet heads to use in the forming. In such a case, however, enlargement of the device and increase in cost are inevitable due to enlargement of a head section, which is a section including the ink jet head, enlargement of a driving section that drives the enlarged head section, and the like.

Furthermore, consideration is being made in recent years to form not only a colorless or monochromatic 3D object, but also a 3D object colored to various colors. In such a case, a great number of ink jet heads needs to be used to carry out the forming using a coloring ink of a plurality of colors. In such a case, if the number of ink jet heads is simply increased to increase the speed of the forming speed, problems of enlargement of the device and increase in cost become particularly significant. More specifically, for example, when attempting to double the forming speed, the number of ink jet heads is, simply thinking, to be doubled for the inks of all the colors used. However, if the number of ink jet heads is increased in such a manner, the problems of enlargement of the device and increase in cost become extremely large.

Therefore, it is conventionally desired to increase the forming speed through a more appropriate method. It is thus an object of the present disclosure to provide a forming device and a forming method capable of overcoming the problems described above.

The inventors of the present application conducted a thorough research on a method for more appropriately increasing the forming speed. In this research, consideration is made to increase the forming speed while suppressing the increase in the number of ink jet head as much as possible. It was found that the forming speed can be increased while suppressing the increase in the number of ink jet heads to a minimum by increasing the forming speed only when carrying out the forming under a specific condition, for example, rather than by increasing the forming speed in all cases.

More specifically, for example, consideration is made to carry out the forming at a standard speed when carrying out the forming while carrying out coloring at high precision, and to increase the forming speed only at the time of forming in other specific forming modes. In this case, consideration is made to increase the forming speed by using the coloring ink for applications (e.g., forming of interior of 3D object, etc.) other than coloring in a forming mode of carrying out the forming at high speed.

The inventors of the present application also considered a method of more appropriately increasing the speed for when increasing the forming speed in such method. In this case, the inventors found that the forming speed can be more appropriately increased by enhancing the discharging ability of the ink jet head that forms the support layer at the periphery of the 3D object.

More specifically, for each section of the 3D object, the forming speed can be increased by, for example, using the coloring ink for applications other than coloring, as described above. In the case of the support layer, however, it cannot be usually formed by mixing other materials such as the coloring ink due to the characteristics of being removed (e.g., dissolution removal) after the completion of forming. Even if other materials are mixed, the amount needs to be small to an extent of not affecting the function of the support layer. This is because the removal of the support layer becomes difficult if, for example, the support layer is formed by mixing ink other than the material of the support layer. It may also not be preferable if the support layer has an unnecessary color. Thus, when increasing the forming speed, the material of the support layer cannot be appropriately compensated with other inks, and the like, and hence the discharging ability of the ink jet head forming the support layer may become the rate controlling condition.

On the other hand, if the discharging ability of the ink jet head forming the support layer is enhanced, the forming speed can be appropriately increased without changing the number and the discharging ability of the ink jet heads for other inks. The forming speed thus can be more appropriately increased while suppressing the increase in the number of ink jet heads to use.

In other words, in order to solve the problem described above, the present disclosure provides a forming device that forms a 3D object by discharging a material from a nozzle row in which a plurality of nozzles are lined in a nozzle row direction, the forming device including a head section including the plurality of nozzle rows; and a scanning driving section that causes the head section to perform a scanning operation of discharging a material of the 3D object while relatively moving with respect to the 3D object being formed; in which the head section includes, for the plurality of nozzle rows, a first nozzle row group including one or more nozzle rows that discharge a material of a first color for the material of the 3D object, a second nozzle row group including one or more nozzle rows that discharge a material of a second color different from the first color for the material of the 3D object, and a support nozzle row group including one or more nozzle rows that discharge a material of a support layer that supports a periphery of the 3D object being formed; the forming device carries out an operation of forming based on a forming mode set in advance, and forms at least one part of the 3D object using the first nozzle row group and the second nozzle row group in an operation of at least one of the forming modes and forms the support layer in at least one part of the periphery of the 3D object; and defining a maximum value of a material dischargeable in a unit time in one scanning operation as a material discharging ability, the material discharging ability of the support nozzle row group is greater than the material discharging ability of the first nozzle row group.

According to such configuration, for example, the forming speed can be appropriately increased by forming at least one part of the 3D object using plural types of materials by the first nozzle row group and the second nozzle row group. The forming speed can be appropriately prevented from lowering by the material discharging ability of the support nozzle row group by enhancing the material discharging ability of the support nozzle row group. Thus, for example, the forming speed can be increased through a more appropriate method.

In this case, the forming speed can be increased without changing the number of nozzle rows other than the support nozzle row group, and thus a great increase in the number of nozzle rows, and the like can be prevented. Furthermore, the miniaturization and lighter weight of the head section as well as the enhancement of the forming speed, for example, can be appropriately satisfied.

The forming material discharged from the first nozzle row group and the second nozzle row group is, for example, an ultraviolet curing type ink that cures by irradiation of an ultraviolet ray. In this case, the ink refers to, for example, liquid discharged from the nozzle through the ink jet method. The material of the support layer discharged from the support nozzle row group may also be an ultraviolet curing type ink. In this case, a material that cures weaker than the forming material configuring the 3D object, for example, is preferably used for the material of the support layer. According to such configuration, for example, the support layer can be appropriately removed by dissolution removal, and the like after the completion of the forming.

The first nozzle row group discharges, for example, a forming ink (model material, etc.) of a predetermined color. The first nozzle row group may discharge an ink having light reflectivity such as white. In this case, the ink having light reflectivity may be considered as the forming ink. The first nozzle row group discharges an ink that does not form a region alone in the relevant forming mode. In this case, the ink that does not form a region alone is, for example, an ink that further uses ink of another color other than the relevant ink with respect to the region to be formed using the relevant ink.

The second nozzle row group discharges, for example, any of the coloring inks of a plurality of colors. In this case, the coloring inks of the plurality of colors are, for example, coloring inks of a plurality of colors used when forming a colored 3D object in the forming device. The second nozzle row group may discharge a transparent ink, which is a transparent ink. A nozzle row group that discharges the transparent ink may be considered as a transparent ink nozzle row group different from the first nozzle row group and the second nozzle row group.

The forming device is, for example, a device in which forming in a plurality of forming modes set in advance can be carried out. More specifically, the forming device can execute, for example, a surface decoration mode, an interior coloring mode, and the like for the forming modes. In this case, the surface decoration mode is, for example, a forming mode of carrying out coloring with respect to a surface of the 3D object. The interior coloring mode is, for example, a forming mode of carrying out the forming at a higher speed than the surface decoration mode by using at least one of the coloring inks for the forming of the interior of the 3D object. In this case, in the interior coloring mode, the forming device, for example, forms at least one part of the 3D object using the first nozzle row group and the second nozzle row group, and forms the support layer on at least one part of the periphery of the 3D object.

The forming device can, for example, carry out forming in a plurality of surface decoration modes in which the forming speed differs from each other. In this case, for example, in a first surface decoration mode, coloring is carried out with respect to a surface of the 3D object under a predetermined condition. In a second surface decoration mode, forming is carried out under a condition partially different from the first surface decoration mode, and forming is carried out at a higher speed than the first surface decoration mode while carrying out coloring with respect to the 3D object.

In this case, the manner of forming the light reflective region formed on the inner side of the coloring region colored by the coloring ink is differed between the first surface decoration mode and the second surface decoration mode. More specifically, at the time of forming in the first surface decoration mode, the light reflective region is formed using the ink having light reflectivity and without using the transparent ink. At the time of forming in the second surface decoration mode, the light reflective region is formed using the ink having light reflectivity and the transparent ink.

Moreover, in this case, the manner of forming the coloring region is preferably differed between the first surface decoration mode and the second surface decoration mode. More specifically, in this case, the coloring region is formed using the transparent ink at a greater ratio in the second surface decoration mode, compared to the time of forming in the first surface decoration mode. Accordingly, for example, the forming speed in the second surface decoration mode can be appropriately increased.

Furthermore, as a configuration of the present disclosure, using a forming method having the characteristics similar to the above, and the like is also considered. In this case as well, for example, effects similar to above can be obtained.

According to the present disclosure, for example, the forming speed can be increased through an appropriate method.

BRIEF DESCRIPTION OF THE DRAWINGS

FIG. 1A shows one example of a configuration of a main part of the forming device 10. FIG. 1B shows one example of a configuration of a head section 12 of the forming device 10. FIG. 1C shows one example of a configuration of an ink jet head in the head section 12.

FIG. 2A shows one example of a coloring mode that can be executed by the forming device 10. FIG. 2B is a cross-sectional view showing one example of a configuration of a 3D object 50 formed by a surface decoration mode. FIG. 2C is a cross-sectional view showing one example of a configuration of the 3D object 50 formed by a monochromatic/tinting mode. FIGS. 2B and 2C show X-Y cross sections, but Z-X cross section and Z-Y cross section are also cross-sectional views of a similar configuration.

FIG. 4A shows an example of Y direction continuous. FIG. 4B shows an example of X direction continuous. FIG. 4C shows an example of two-dimensional dispersion with four heads. FIG. 4D shows an example of two-dimensional dispersion with five heads. FIG. 4E shows an example of a manner of discharging ink when forming the interior, and the like of the 3D object 50 so as to represent a predetermined color.

FIG. 9A shows one example of a configuration of the head section 12 when the material discharging ability of the transparent ink nozzle row group is enhanced. FIG. 9B shows one example of an operation of forming in the first surface decoration mode. FIG. 9C shows one example of the operation of forming in the second surface decoration mode.

FIG. 10A shows one example of a method of enhancing the material discharging ability of the nozzle row group. FIG. 10B shows another example of a method of enhancing the material discharging ability of the nozzle row group. FIG. 10C shows another further example of a method of enhancing the material discharging ability of the nozzle row group.

DETAILED DESCRIPTION OF PREFERRED EMBODIMENTS

Figure 1A:
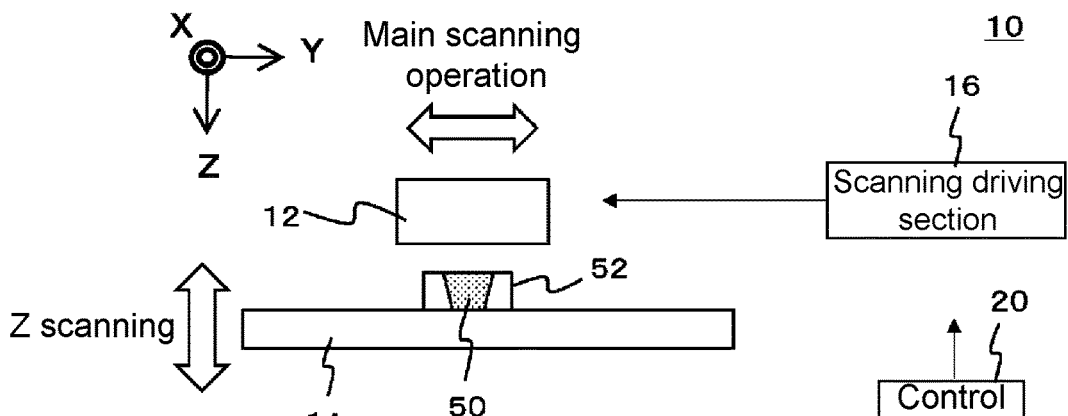
FIGS. 1A to 1C are drawings showing one example of a forming device 10 according to one embodiment of the present disclosure.
Figure 1B:
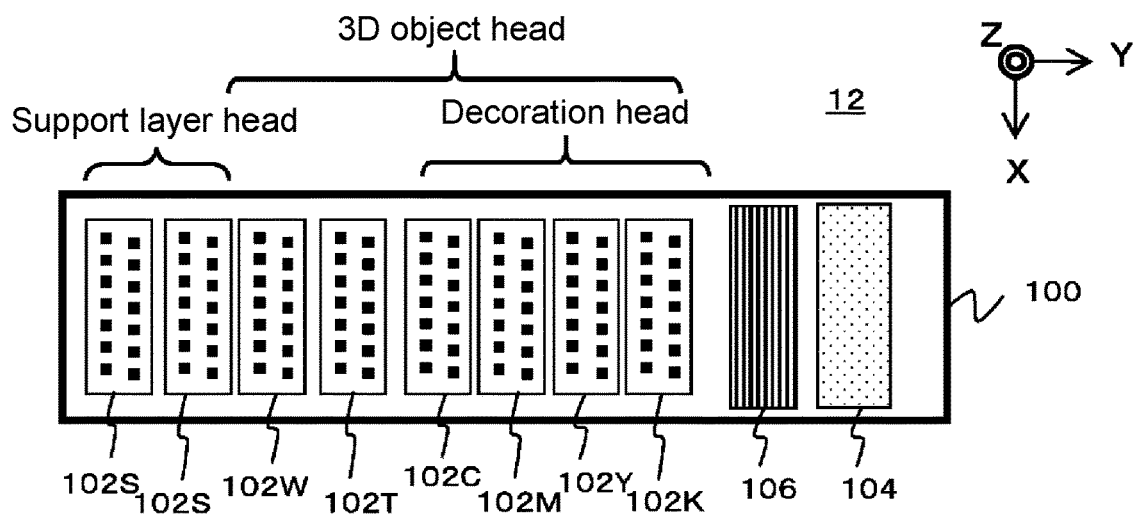
Figure 1C:
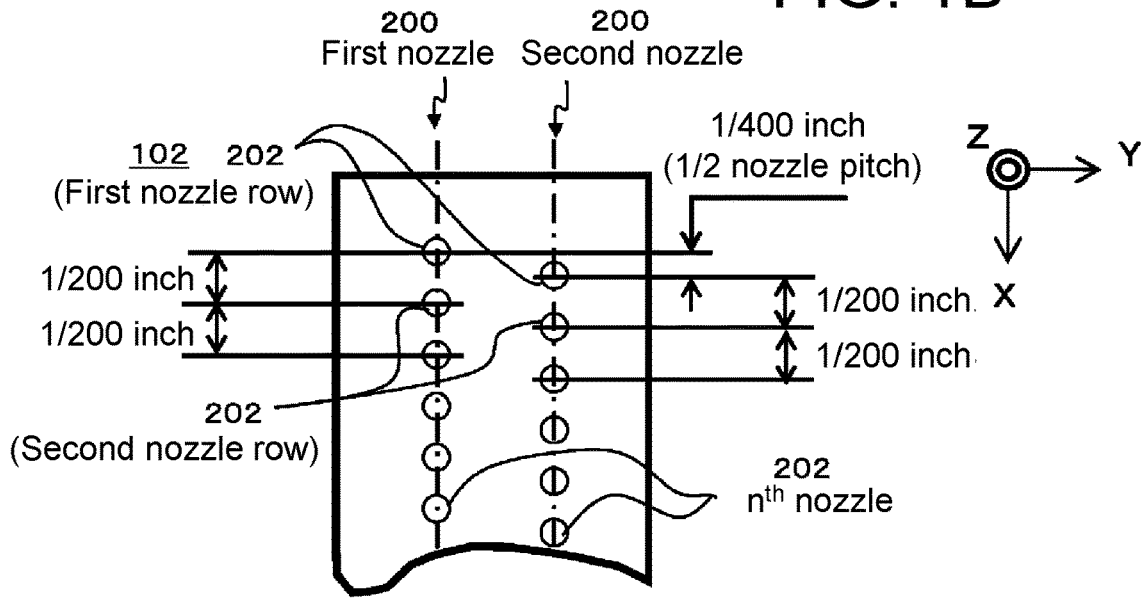

Embodiments according to the present disclosure will be hereinafter described with reference to the drawings. FIGS. 1A to 1C show one example of a forming device 10 according to one embodiment of the present disclosure. FIG. 1A shows one example of a configuration of a main part of the forming device 10. FIG. 1B shows one example of a configuration of a head section 12 of the forming device 10. FIG. 1C shows one example of a configuration of an ink jet head in the head section 12.

Other than the points described below, the forming device 10 may have a configuration same as or similar to a known forming device. More specifically, other than the points described below, the forming device 10 may have, for example, a configuration same as or similar to a known forming device that carries out forming by discharging a liquid droplet (ink droplet), to become the material of a 3D object 50, using an ink jet head. Furthermore, other than the illustrated configuration, the forming device 10 may, for example, further have various types of configurations required for forming, coloring, and the like of the 3D object 50.

In the present example, the forming device 10 is a forming device (3D forming device) that forms the 3D object 50 through a stacking forming method. In this case, the stacking forming method is, for example, a method of forming the 3D object 50 by stacking a plurality of layers. The forming object 50 is, for example, a stereoscopic three-dimensional structural object. In the present example, the forming device 10 includes the head section 12, a forming board 14, a scanning driving section 16, and a control section 20.

The head section 12 is a section that discharges the material of the 3D object 50. In this case, discharging the material of the 3D object 50 means, for example, discharging the liquid droplet (ink droplet) of the ink to become the material of the 3D object 50. In this case, the ink refers to, for example, liquid discharged from the ink jet head. Furthermore, the head section 12 includes a plurality of ink jet heads, and an ultraviolet light source. In this case, the ink jet head is, for example, a discharge head that discharges the liquid droplet through an ink jet method.

More specifically, the head section 12 discharges the liquid droplet of the ink, which cures according to a predetermined condition, from the plurality of ink jet heads as a liquid droplet to become the material of the 3D object 50. Each layer configuring the 3D object 50 is formed in an overlapping manner by curing the landed ink. In the present example, an ultraviolet curing type ink (UV ink), which is cured from a liquid state by irradiation of an ultraviolet ray, is used for the ink.

In the present example, the head section 12 further discharges a material of a support layer 52 in addition to the material of the 3D object 50. The forming device 10 thereby forms the support layer 52, as necessary, at a periphery of the 3D object 50. In this case, the support layer 52 is, for example, a stacked structural object that supports the 3D object 50 by surrounding the outer periphery of the 3D object 50 being formed. At the time of the forming of the 3D object 50, the support layer 52 is formed as necessary, and removed after the completion of the forming. A more specific configuration of the head section 12 will be hereinafter described in detail.

The forming board 14 is a board-like member that supports the 3D object 50 being formed, and is arranged at a position facing the ink jet heads in the head section 12 and has the 3D object 50 being formed placed on an upper surface. In the present example, the forming board 14 has a configuration in which at least the upper surface is movable in a stacking direction (Z direction in the figure), where at least the upper surface is moved in accordance with the advancement of the forming of the 3D object 5 by being driven by the scanning driving section 16. In this case, the stacking direction is, for example, a direction in which the forming material is stacked in the stacking forming method. More specifically, in the present example, the stacking direction is a direction (Z direction in the figure) orthogonal to a main scanning direction (Y direction in the figure) and a sub-scanning direction (X direction in the figure).

The scanning driving section 16 is a driving section that causes the head section 12 to perform a scanning operation of relatively moving with respect to the 3D object 50 being formed. In this case, relatively moving with respect to the 3D object 50 being formed means, for example, relatively moving with respect to the forming board 14. In the present example, the scanning driving section 16 causes the head section 12 to perform the main scanning operation (Y scanning), the sub-scanning operation (X scanning), and the stacking direction scanning (Z scanning) set in advance.

Here, causing the head section 12 to carry out the main scanning operation means, for example, causing the ink jet head of the head section 12 to carry out the main scanning operation. The main scanning operation is, for example, an operation of discharging ink while moving in the main scanning direction. The main scanning operation is an example of a scanning operation of discharging the material of the 3D object 50 while relatively moving with respect to the 3D object 50 being formed. In the present example, the scanning driving section 16 causes the head section 12 to carry out the main scanning operation by fixing the position of the forming board 14 in the main scanning direction, and moving the head section 12 side. In an alternative embodiment of the configuration of the forming device 10, for example, the 3D object 50 side may be moved by fixing the position of the head section 12 in the main scanning direction and, for example, moving the forming board 14.

At the time of the main scanning operation of the present example, the scanning driving section 16 further drives the ultraviolet light source in the head section 12. More specifically, the scanning driving section 16, for example, turns ON the ultraviolet light source during the main scanning operation to cure the ink landed on a forming surface of the 3D object 50. The forming surface of the 3D object 50 is, for example, a surface on which a next ink layer is formed by the head section 12.

Causing the head section 12 to carry out the sub-scanning operation means, for example, causing the ink jet head of the head section 12 to carry out the sub-scanning operation. The sub-scanning operation is, for example, an operation of relatively moving with respect to the forming board 14 in the sub-scanning direction orthogonal to the main scanning direction. The sub-scanning operation may be an operation of relatively moving with respect to the forming board 14 in the sub-scanning direction by a feeding amount set in advance.

In the present example, the scanning driving section 16 causes the head section 12 to carry out the sub-scanning operation between the main scanning operations. In this case, the scanning driving section 16, for example, causes the head section 12 to carry out the sub-scanning operation by fixing the position of the head section 12 in the sub-scanning direction, and moving the forming board 14. The scanning driving section 16 may cause the head section 12 to carry out the sub-scanning operation by fixing the position of the forming board 14 in the sub-scanning direction, and moving the head section 12. The scanning driving section 16 causes the head section 12 to carry out the sub-scanning operation only when necessary according to the size of the 3D object 50 to form. Thus, when forming the 3D object 50 of a small size, and the like, the 3D object 50 may be formed without carrying out the sub-scanning operation.

Causing the head section 12 to carry out the stacking direction scanning means, for example, causing the ink jet head of the head section 12 to carry out the stacking direction scanning. The stacking direction scanning is, for example, an operation of moving at least one of the head section 12 or the forming board 14 in the stacking direction to relatively move the head section 12 in the stacking direction with respect to the 3D object 50. In this case, moving the head section 12 in the stacking direction means, for example, moving the ink jet head in the head section 12 in the stacking direction. Moving the forming board 14 in the stacking direction means, for example, moving the position of at least the upper surface in the forming board 14.

The scanning driving section 16 changes a head-board distance, which is a distance between the ink jet head in the head section 12 and the forming board 14, by causing the head section 12 to carry out the stacking direction scanning in accordance with the advancement of the operation of forming. The head-board distance may be, for example, a distance between a nozzle surface where a nozzle (nozzle hole) is formed in the ink jet head and the upper surface of the forming board 14. More specifically, in the present example, the scanning driving section 16 fixes the position of the head section 12 in the stacking direction and moves the forming board 14. The scanning driving section 16 may fix the position of the forming board 14 in the stacking direction, and move the head section 12.

The control section 20 is, for example, a CPU of the forming device 10, and controls each section of the forming device 10 to control the operation of the forming of the 3D object 50. The control section 20 preferably controls each section of the forming device 10 on the basis of, for example, shape information, color image information, and the like of the 3D object 50 to be formed. According to the present example, the 3D object 50 can be appropriately formed.

Now, a more specific configuration of the head section 12 will be described. In the present example, the head section 12 includes a plurality of ink jet heads. Each ink jet head has a nozzle row in which a plurality of nozzles are lined in a predetermined nozzle row direction on a surface facing the forming board 14. The forming device 10 forms the 3D object 50 by discharging a material from the plurality of nozzle rows in the head section 12.

More specifically, in the present example, the head section 12 includes a carriage 100, a plurality of ink jet heads, an ultraviolet light source 104, and a flattening roller 106. The carriage 100 is a holding member that holds the plurality of ink jet heads, the ultraviolet light source 104, and the flattening roller 106. The head section 12 includes, for the plurality of ink jet heads, a plurality of ink jet heads 102S, ink jet heads 102W, ink jet heads 102T, ink jet heads 102C, ink jet heads 102M, ink jet heads 102Y, and ink jet heads 102K, as shown in FIG. 1B. The plurality of ink jet heads are, for example, arranged to line in the main scanning direction with the positions in the sub-scanning direction aligned.

The plurality of ink jet heads 102S are ink jet heads (support layer heads) that discharge the material of the support layer 52. In the present example, an ultraviolet curing type ink having a weaker cure degree by the ultraviolet ray than the material of the 3D object 50 is used for the material of the support layer 52. In this case, each of the plurality of ink jet heads 102S discharges the ultraviolet curing type ink to become the material of the support layer 52 from each nozzle in the nozzle row.

The support layer 52 is, for example, a layer that supports an overhang shape of the 3D object 50 from below to allow forming. Before the start of the forming operation, consideration is also made to discharge the material of the support layer 52 to a forming area in the forming board 14, and form the support layer 52 to a plate shape, and the like. According to such configuration, for example, the unevenness of the surface of the forming board 14 is corrected so that planarity can be more appropriately ensured. A water soluble material that can be dissolved with water after the forming of the 3D object 50 is preferably used for the material of the support layer 52. In this case, a material that has a weaker cure degree than the material configuring the 3D object 50 and that easily decomposes is preferably used. Furthermore, a known material for the support layer, for example, can be suitably used for the material of the support layer 52. According to such configuration, for example, the support layer 52 can be appropriately removed by dissolution removal, and the like after the completion of the forming.

In the head section 12, the ink jet heads other than the plurality of ink jet heads 102S are 3D object heads (forming material discharge heads) used for the forming of the 3D object 50. Among the 3D object heads, the ink jet heads 102W are ink jet heads that discharge white (W) ink, and discharge the white ink from each nozzle in the nozzle row. In the present example, the white ink is an example of a light reflective ink, and for example, is used when forming a region (light reflective region) having a property of reflecting light in the 3D object 50. The light reflective region is, for example, a region for performing full color representation by subtractive color mixing with respect to the surface of the 3D object 50. An ultraviolet curing type ink containing an inorganic pigment in a component, for example, can be suitably used for the white ink. Other than the material of the light reflective region, for example, the white ink can also be used as one of the interior materials configuring the shape of the 3D object 50. In this case, the white ink is used as an ink for forming. The forming ink is, for example, an ink used to form the interior, and the like of the 3D object 50. The white ink is also a material uniquely used at the time of the forming of the white 3D object 50. Furthermore, the white ink may also be a color material for representing a light color by being mixed with ink of other colors.

The ink jet heads 102T are ink jet heads that discharge transparent ink, and discharge the transparent ink from each nozzle in the nozzle row. The transparent ink is, for example, ink of clear color, which is a colorless transparent color (T). The transparent ink is an example of a transparent color ink. The transparent ink can be used, for example, as one of the interior materials configuring the shape of the 3D object 50. The transparent ink is also a material uniquely used at the time of the forming of the transparent 3D object 50. Furthermore, the transparent ink may also be a color material for representing a light color by being mixed with ink of other colors.

In the present example, when carrying out surface decoration of coloring the surface of the 3D object 50 in full color, for example, the transparent ink is also used in an application of interpolating the change in density of the coloring ink to make the ink density constant. When carrying out coloring in the surface decoration, the transparent ink can also be used as a material for separating the light reflective region and a colored region (color layer). Furthermore, the transparent ink can also be used to form a protective (color degradation, scratches, dirt) region (protective film) arranged on an outermost layer of the 3D object 50.

The ink jet heads 102C, the ink jet heads 102M, the ink jet heads 102Y, and the ink jet heads 102K (hereinafter referred to as ink jet heads 102C to 102K) are ink jet heads (decoration heads) for coloring used at the time of forming of the colored 3D object 50, and discharge the respective inks of the coloring ink (decoration ink) of a plurality of colors used for coloring from each nozzle in the nozzle row. More specifically, the ink jet heads 102C discharge cyan (C color) ink. The ink jet heads 102M discharge magenta (M color) ink. The ink jet heads 102Y discharge yellow (Y color) ink. The ink jet heads 102K discharge black (K color) ink. In this case, each color of CMYK is an example of a process color used for full color representation. The full color representation is, for example, a representation of colors obtained with a combination in which subtractive color mixing by inks of process colors can be performed.

The ultraviolet light source 104 is a light source (UV source) for curing ink, and generates an ultraviolet ray for curing the ultraviolet curing type ink. UVLED (ultraviolet LED), and the like can be suitably used for the ultraviolet light source 104. Furthermore, consideration is also made to use metal halide lamp, mercury lamp, and the like for the ultraviolet light source 104. The flattening roller 106 has a configuration of flattening the ink layer formed during the forming of the 3D object 50. The flattening roller 106, for example, flattens the ink layer by making contact with the surface of the ink layer, and removing one part of the pre-cured ink at the time of the main scanning operation.

The ink layer configuring the 3D object 50 can be appropriately formed by using the head section 12 having the above configuration. Furthermore, the 3D object 50 can be appropriately formed by forming a plurality of ink layers in an overlapping manner.

A specific configuration of the head section 12 is not limited to the configuration described above, and can be variously modified. For example, the head section 12 may further include, in addition to the ink jet heads 102C to 102K, ink jet heads for light colors of each color, for colors such as R (red), G (green), B (blue), orange, etc., and the like for the ink jet heads for coloring. Rather than using the white ink, an ink dedicated to forming may be used as an ink for forming the interior region of the 3D object 50. In this case, the head section 12 further includes, for example, an ink jet head that discharges a forming ink (model material MO) of a predetermined color. The manner of lining the plurality of ink jet heads in the head section 12 can also be variously modified. For example, the position in the sub-scanning direction of some ink jet heads may be shifted from the other ink jet heads.

The head section 12 may include a plurality of ultraviolet light sources 104. In this case, the plurality of ultraviolet light sources 104 are preferably arranged to sandwich the arrangement of the plurality of ink jet heads in the main scanning direction. The head section 12 may include a plurality of flattening rollers 106.

Next, a configuration of each ink jet head in the head section 12 will be more specifically described. In the present example, the head section 12 includes an ink jet head (hereinafter described as ink jet head 102) having the same configuration for each of the plurality of ink jet heads described above. A known ink jet head, for example, can be suitably used for the ink jet head 102.

In the present example, the ink jet head 102 includes a nozzle row 200 in which a plurality of nozzles 202 are lined in a nozzle row direction parallel to the sub-scanning direction, as shown in FIG. 1C. More specifically, each ink jet head 102 includes two nozzle rows 200, shown as a first nozzle row and a second nozzle row in the figure. In each nozzle row 200, the plurality of nozzles 202 are lined in the sub-scanning direction, shown as a first nozzle, a second nozzle, an $n^{th}$ nozzle, and the like in the figure. Furthermore, each nozzle row 200 is lined such that the position of each nozzle 202 in the sub-scanning direction is shifted by half-pitch. In this case, half-pitch is a distance of half of a nozzle interval in one nozzle row 200.

More specifically, in the illustrated configuration, the respective nozzle rows 200 are a row in which the plurality of nozzles 202 are lined at a resolution of 200 dpi. In this case, the interval of the nozzles 202 is 1/200 inch in the respective nozzle rows 200. Furthermore, when the position in the sub-scanning direction of each nozzle 202 is shifted by half-pitch (1/400 inch) between the two nozzle rows 200, the resolution (recording density in the X direction) in the sub-scanning direction that can be realized in one main scanning operation with one ink jet head 102 becomes 400 dpi. Thus, each ink jet head 102 in the head section 12 forms a line of ink dots at a density the resolution in the sub-scanning direction becomes 400 dpi in one main scanning operation.

Here, as described above, in the present example, the head section 12 discharges plural types of materials different from each other with the plurality of ink jet heads. Each of the plurality of ink jet heads includes two nozzle rows 200. In this case, consideration can be made to divide the plurality of nozzle rows in the head section 12 into a nozzle row group grouped for every nozzle row that discharges the ink of the same color. In this case, the nozzle row group is a group configured by one or more nozzle rows 200 that discharge the ink of the same color.

More specifically, in the present example, the head section 12 includes four nozzle rows 200 worth two ink jet heads 102S for the nozzle row 200 that discharges the ink to become the material of the support layer 52. In this case, the four nozzle rows 200 can be considered as a support nozzle row group, which is a nozzle row group for the material of the support layer 52.

The head section 12 includes two nozzle rows 200 worth one ink jet head for the nozzle row 200 that discharges the ink of each color other than the material of the support layer 52. In this case, the two nozzle rows 200 for each color can be considered as a nozzle row group for the ink of each color. In this case, the nozzle row group for the ink of each color is, for example, a white ink nozzle row group, which is the nozzle row group for white ink, a transparent ink nozzle row group, which is the nozzle row group for transparent ink, a C color nozzle row group, which is the nozzle row group for C color ink, a M color nozzle row group, which is the nozzle row group for M color ink, a Y color nozzle row group, which is the nozzle row group for Y color ink, and a K color nozzle row group, which is the nozzle row group for K color ink.

As described above, in the present example, the two nozzle rows 200 of one ink jet head 102 have the positions in the sub-scanning direction shifted. Thus, the two nozzle rows 200 can be collectively considered as substantially one nozzle row. In this case, the number of nozzle rows configuring the respective nozzle row groups may be the substantive number of nozzle rows.

When the plurality of nozzle rows are divided into nozzle row groups as described above, a material discharging ability can be considered with respect to each nozzle row group. In this case, the material discharging ability is, for example, a maximum value of the material that can be discharged in a unit time in one main scanning operation. The material that can be discharged in a unit time in the one main scanning operation is, for example, a material that can be discharged with respect to a region the nozzle row group passes during the unit time in the main scanning operation.

Thus, the material discharging ability may be considered as, for example, a maximum value of the material that can be discharged with respect to an area of the relevant region. The material discharging ability is preferably set according to the characteristics of the 3D object 50 to be formed.

More specifically, when forming the 3D object 50 using various materials as in the present example, an amount to be discharged in one main scanning operation may differ depending on the material. In such a case, if the material discharging ability of the corresponding nozzle row group is insufficient for one of the materials, the 3D object 50 cannot be appropriately formed in such a state. Thus, in such a case, for example, the number of paths in a multi-path operation needs to be increased, the moving speed of the head section 12 at the time of the main scanning operation needs to be lowered, and the like, so that sufficient amount can be discharged in each main scanning operation even in such nozzle row group. However, if such change is made, the forming speed may lower and the time required for forming may increase.

On the contrary, in order to carry out the forming at high speed so that insufficiency of the material discharging ability does not arise, for example, consideration is also made to increase the number of ink jet heads for the respective materials, and enhance the material discharging ability of the respective nozzle row groups. In this case, however, the head section 12 enlarges, and the enlargement of the forming device 10 and increase in cost become inevitable. Therefore, it is not preferable to simply enhance the material discharging ability of the respective nozzle row groups.

The inventors of the present application thus conducted a thorough research on a method of increasing the forming speed while avoiding the head section 12 from enlarging more than necessary. In terms of satisfying both miniaturization and lighter weight of the head section 12 and increase in the forming speed, it was found that it is preferable to enhance the material discharging ability of the support nozzle row group of the nozzle row groups in the head section 12.

More specifically, in the forming device 10, for example, a user sometimes selects one of a plurality of forming modes according to the purpose of forming to carry out the forming. In this case, for example, consideration is made to have a forming mode of prioritizing to carry out the forming at a higher speed and a forming mode of prioritizing the precision of the forming and intentionally carrying out the forming at a low speed selectable. In the forming mode of prioritizing to carry out the forming at a higher speed, for example, a plurality of nozzle row groups may be used to form each region of the 3D object 50. More specifically, in this case, for example, consideration is made to use the ink for forming, and the like rather than the ink for coloring, which is the originally intended purpose, for the ink of each color of CMYK for coloring. According to such configuration, for example, the forming can be carried out at a higher speed by carrying out the forming using a greater number of nozzle row groups. For the forming mode of prioritizing the precision of the forming and intentionally carrying out the forming at a low speed, for example, a forming mode of carrying out the forming while performing coloring with the ink of each color of CMYK for coloring is considered. In this case, for example, consideration is made to perform coloring with the ink of each color of CMYK, and the like on a region of a surface that can be visually recognized from the outside in the 3D object 50.

When carrying out the forming in such various forming modes, the upper limit of the forming speed in the respective forming modes is, for example, determined according to the material discharging ability of the nozzle row group used in the relevant forming mode. Thus, in this case, the material discharging ability of the nozzle row group to use is preferably appropriately set in the respective forming modes. In this case, the forming speed is desirably appropriately prevented from lowering by the influence of the material discharging ability of any of the nozzle row groups particularly for the forming mode of carrying out the forming at a higher speed.

With regards to this point, the inventors of the present application focused on the difference of the support nozzle row group and the other nozzle row groups. More specifically, in the present example, the nozzle row group other than the support nozzle row groups discharges the material of the 3D object 50 to become a resultant product of the forming. On the contrary, the support nozzle row group discharges the material of the support layer 52 to be removed after the forming instead of the material configuring the 3D object 50. The support nozzle row group thus discharges a material having a property different from the other nozzle row groups. As a result, in any forming mode, the formation of the support layer 52 needs to be substantially carried out only with the support nozzle row group. More specifically, when carrying out the forming with the forming device 10 shown in FIGS. 1A to 1C, for example, the support layer 52 needs to be formed using only the ink jet heads 102S.

When referring to substantially carrying out the formation of the support layer 52 with only the support nozzle row group, this means, for example, forming at least a main part of the support layer 52 with only the support nozzle row group. Thus, for example, consideration is made to use the nozzle row group other than the support nozzle row group, and the like for one part of the support layer 52. More specifically, when referring to substantially carrying out the formation of the support layer 52 with only the support nozzle row group, for example, this may mean forming 60% and more, and preferably 80% and more of the support layer 52 with only the support nozzle row group.

Focusing on the operation of forming the 3D object 50, for example, in the forming mode of carrying out the forming at a higher speed, consideration is made to carry out the forming of the 3D object 50 using all the support nozzle row groups. More specifically, in the case of the configuration of the forming device 10 shown in FIGS. 1A to 1C, the 3D object 50 can be formed using the ink jet heads 102W, the ink jet heads 102T, the ink jet heads 102C, the ink jet heads 102M, the ink jet heads 102Y, and the ink jet heads 102K shown for the 3D object head.

In this case, the forming speed in the forming mode of carrying out the forming at a higher speed is, for example, assumed to be determined with the material discharging ability of the support nozzle row group as the rate controlling condition. Thus, in the forming mode of carrying out the forming at a higher speed, it is preferable to appropriately enhance the material discharging ability of the support nozzle row group to carry out the forming at a sufficiently high speed.

In the present example, on the other hand, the material discharging ability of the support nozzle row group is enhanced using only the ink jet heads 102S in plurals of the ink jet heads for various intended purposes in the head section 12. As a result, in the present example, the material discharging ability of the support nozzle row group becomes greater than the material discharging ability of the nozzle row group that discharges the ink of any other color. Thus, according to the present example, for example, a higher speed forming can be more appropriately carried out.

In the configuration shown in FIGS. 1A to 1C, the number of ink jet heads 102S, which are the support layer heads, is two. On the other hand, the number of 3D object heads including all the ink jet heads other than the ink jet heads 102S is six. Thus, in order to further increase the speed of forming, consideration is made to, for example, further increase the number of ink jet heads 102S and further enhance the material discharging ability of the support nozzle row group. However, if the number of ink jet heads 102S is too large, problems such as enlargement of the head section 12 may arise. Furthermore, in other forming modes, for example, the material discharging ability of the support nozzle row group may become greater than necessary. Thus, the number of ink jet heads 102S is preferably appropriately determined in view of the balance with the size of the head section 12, and the like. In this case as well, the forming speed can be appropriately increased by making the material discharging ability of the support nozzle row group greater than the material discharging ability of the other nozzle row groups.

In this case, the forming speed can be increased without changing the number of nozzle rows other than the support nozzle row group, and thus a great increase in the number of nozzle rows, and the like can be prevented. Furthermore, the miniaturization and lighter weight of the head section 12 as well as the enhancement of the forming speed, for example, can be appropriately satisfied.

Considering the characteristics of the present example in a more generalized manner, any one of the nozzle row groups other than the support nozzle row group can be assumed as a first nozzle row group. In this case, the first nozzle row group is, for example, a nozzle row group including one or more nozzle rows that discharges a material of a first color as the material of the 3D object 50. Any of the other nozzle groups can be considered as a second nozzle row group. In this case, the second nozzle row group is, for example, a nozzle row group including one or more nozzle rows that discharges a material of a second color, different from the first color, as the material of the 3D object 50. In this case, the forming device 10, for example, carries out the operation of forming based on the forming mode set in advance, and forms at least one part of the 3D object 50 using the first nozzle row group and the second nozzle row group in the operation of at least one of the forming modes. The support layer 52 is formed at least at a part of the periphery of the 3D object 50. In this case, it is preferable to have the material discharging ability of the support nozzle row group greater than the material discharging ability of at least the first nozzle row group.

According to such configuration, for example, the forming speed can be appropriately increased by forming at least one part of the 3D object using plural types of materials by the first nozzle row group and the second nozzle row group. The forming speed can be appropriately prevented from lowering by the material discharging ability of the support nozzle row group by enhancing the material discharging ability of the support nozzle row group. Thus, for example, the forming speed can be increased through a more appropriate method.

In the present example, the white ink nozzle row group is an example of the first nozzle row group. When considered in a more generalized manner, focusing on the ink of any one color other than white, the nozzle row group that discharges the ink of the relevant one color may be assumed as the first nozzle row group. In other words, any nozzle row group other than the white ink nozzle row group may be considered as the first nozzle row group. In this case, the first nozzle row group may be, for example, a nozzle row group for discharging ink that does not form a region alone in any of the forming modes of carrying out the forming at high speed. The ink that does not form a region alone is, for example, an ink that further uses ink of another color other than the relevant ink with respect to the region to be formed using the relevant ink. In an alternative embodiment of the configuration of the forming device 10, when using the forming ink (e.g., ink dedicated to forming) of a predetermined color other than white, for example, a nozzle row group that discharges the relevant ink can be considered as a first nozzle row group.

Each of the C color nozzle row group, the M color nozzle row group, the Y color nozzle row group, and the K color nozzle row group, which are the nozzle row groups for coloring, is one example of a second nozzle row group. In this case, the nozzle row included in the second nozzle row group discharges any one of the coloring inks of a plurality of colors. Furthermore, the material discharging ability of the support nozzle row group is preferably greater than the material discharging ability of the second nozzle row group. According to such configuration, for example, the forming speed can be more appropriately increased.

In the present example, the transparent ink nozzle row group may be considered as one example of the second nozzle row group. Each of the C color nozzle row group, the M color nozzle row group, the Y color nozzle row group, and the K color nozzle row group can be considered as one example of the first nozzle row group. In this case, for example, any one of the C color nozzle row group, the M color nozzle row group, the Y color nozzle row group, and the K color nozzle row group may be considered as one example of the first nozzle row group, and any one of the other nozzle row groups may be considered as one example of the second nozzle row group.

Figure 2A:
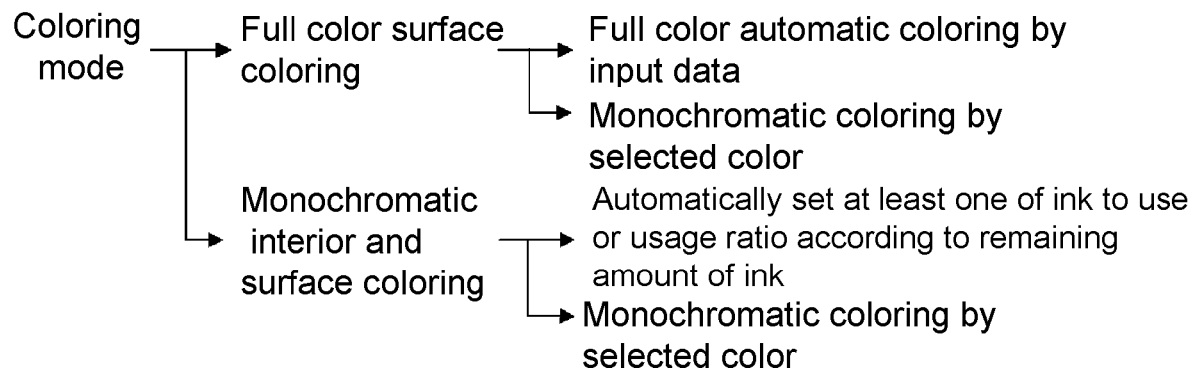
FIGS. 2A to 2C show one example of the operation of forming carried out by the forming device 10.
Figure 2B:
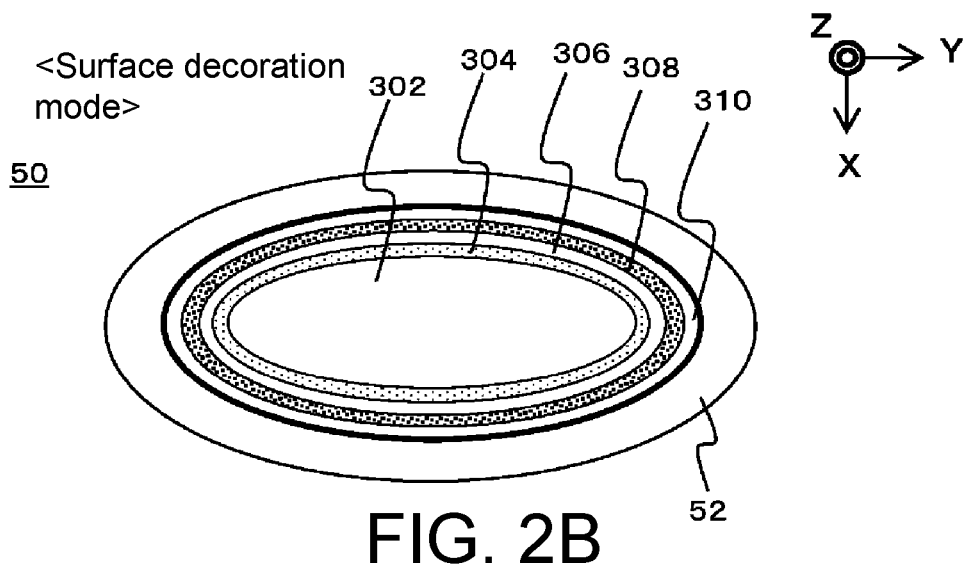
Figure 2C:
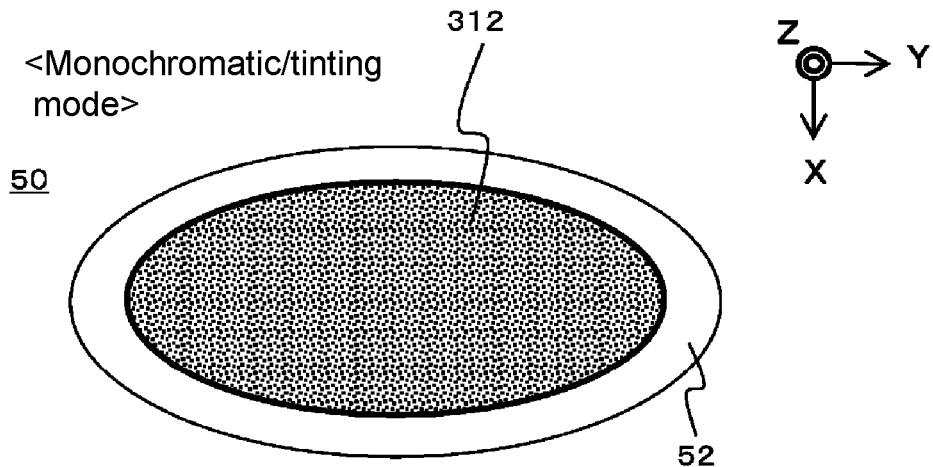

Next, an operation of forming carried out by the forming device 10 of the present example will be further described in detail. FIGS. 2A to 2C show one example of the operation of forming carried out by the forming device 10. In the present example, the forming device 10 is a device in which forming in a plurality of forming modes set in advance can be carried out. For such forming modes, the forming device 10 can carry out at least forming in the coloring mode, which is a forming mode of forming the 3D object 50 colored using the nozzle row group for coloring.

FIG. 2A shows one example of a coloring mode that can be executed by the forming device 10. In the present example, the forming device 10 can execute at least a surface decoration mode, which is a forming mode of coloring the surface of the 3D object 50 in full color, and a monochromatic/tinting mode, which is a forming mode of coloring the interior and the surface of the 3D object 50 with a single color.

At the time of forming in the surface decoration mode, the forming device 10, for example, forms the 3D object 50 while carrying out automatic coloring in full color based on data input as forming data of the 3D object 50. For such data in this case, consideration is made to use the color data of the surface of the 3D object. Furthermore, when the 3D object is a human, for example, consideration is made to use data indicating color and pattern of skin color, clothes, and the like for the color data. When the 3D object is a structural object, consideration is made to use data indicating pattern of a material, color of character, and the like. At the time of forming in the surface decoration mode, the forming device 10 may color the surface of the 3D object with a single color by a color (selected color) selected by the user. Furthermore, at the time of forming in the monochromatic/tinting mode, the forming device 10, for example, carries out the forming while coloring the interior and the surface of the forming device 10 with a color automatically set according to the remaining amount of ink. In this case, for example, at least one of the type of ink to use and the usage rate of the ink is preferably automatically set. At the time of forming in the monochromatic/tinting mode, the forming device 10 may carry out the coloring with a single color by a color (selected color) selected by the user.

In the present example, the surface decoration mode is one example of a forming mode of coloring at least the surface of the 3D object 50 using the coloring ink of a plurality of colors. In this case, the surface of the 3D object 50 is, for example, a region that can be visually recognized from the outside in the 3D object 50. The surface decoration mode is also one example of a full color coloring mode of decorating the surface of the 3D object 50 with full color. The monochromatic/tinting mode is one example of an interior coloring mode of using the coloring ink for the forming of the interior of the 3D object 50. Furthermore, in this case, the interior coloring mode is, for example, a forming mode of carrying out the forming at a higher speed than the surface decoration mode by using at least one of the coloring inks for the forming of the interior of the 3D object 50. The monochromatic/tinting mode is also one example of a monochromatic color coloring mode of coloring the 3D object 50 with a single color.

FIG. 2B is a cross-sectional view showing one example of a configuration of the 3D object 50 having an elliptical shape formed by the surface decoration mode, and shows one example of the configuration of the 3D object 50 with the support layer 52. In the present example, when carrying out the forming in the surface decoration mode, the forming device 10 forms the 3D object 50 including an interior region 302, a light reflective region 304, a separation region 306, a coloring region 308, and a protective region 310. The interior region 302, the light reflective region 304, the separation region 306, the coloring region 308, and the protective region 310 are formed to be lined in such order from the inner side toward the outer side of the 3D object 50. The forming device 10 forms the support layer 52 on the outer side of the protective region 310.

A total thickness of the three layers of the light reflective region 304, the separation region 306, and the coloring region 308 realizing the surface decoration function is, for example, about 200 μm to 1 mm in a normal direction of an inner side of the surface of the 3D object. Considering from a point of resolution of the surface decoration, the thickness is preferably a thinner thickness of smaller than or equal to 300 μm. Among the regions, the interior region 302 and the light reflective region 304 may be formed, for example, with the same white ink. Furthermore, the separation region 306 and the protective region 310 are not essential, and may respectively form a layer according to the discharging position precision and the usage purpose of the 3D object.

The interior region 302 is a region configuring the interior of the 3D object 50. In the present example, the interior region 302 is a region in which a forming layer, which is an ink layer formed by the forming ink of the 3D object 50, is stacked, and configures the shape of the 3D object 50. At the time of forming in the surface decoration mode, the interior region 302 may be formed with only one type of ink (single ink) or may be formed using plural types of ink. For example, consideration is made to form the interior region 302 with a white ink. In addition to the white ink, the interior region 302 may be formed by further using at least one of the coloring inks. For example, the interior region 302 may be formed using the coloring ink of a plurality of colors. In this case, for example, the interior region 302 may be formed with only the coloring ink without using the white ink.

The light reflective region 304 is a region formed using ink having light reflectivity on the outer side of the interior region 302. In the present example, the forming device 10 forms the light reflective region 304 by forming the ink layer formed with the white ink in an overlapping manner. In this case, the full color representation in the subtractive color mixing can be realized by forming the light reflective region 304 on the inner side of the coloring region 308. The colored 3D object 50, for example, thus can be appropriately formed.

The thickness of the light reflective region 304 is preferably made to a uniform thickness of about 100 µm to 1 mm. In this case, the thickness of the region means, for example, the thickness in the normal direction at the surface of the region. In the present example, the forming device 10 forms the light reflective region 304 using only the white ink. In an alternative embodiment of the configuration of the forming device 10, consideration is also made to form the light reflective region 304 by further using the transparent ink other than the white ink, and the like when, for example, carrying out the forming at a higher speed.

The separation region 306 is a region formed by the transparent ink between the light reflective region 304 and the coloring region 308. In the present example, the forming device 10 forms the separation region 306 by forming the ink layer formed with only the transparent ink in an overlapping manner. The white ink in the light reflective region 304 and the coloring ink in the coloring region 308 can be appropriately prevented from mixing by forming the separation region 306. The thickness of the separation region 306 is preferably made to a uniform thickness of, for example, about 50 to 500 µm.

The coloring region 308 is a region where the coloring is carried out on the surface of the 3D object 50. In the present example, the forming device 10 forms the coloring region 308 by forming a decoration layer, which is a ink layer, formed using the coloring ink of each color of CMYK and the transparent ink in an overlapping manner. In this case, the amount of change in the usage amount of the coloring ink due to the difference in the representing color can be interpolated by using the transparent ink in addition to the coloring ink. Furthermore, the respective decoration layers configuring the separation region 306 can be appropriately formed at a constant thickness. According to such configuration, the full color representation can be appropriately carried out. The thickness of the coloring region 308 is preferably made to a uniform thickness of, for example, about 50 to 500 µm. At a point of resolution of a colored image, for example, the thickness is preferably smaller than or equal to 150 µm.

The protective region 310 is a transparent region for protecting the surface of the 3D object 50. In the present example, the forming device 10 forms the protective region 310 by forming the ink layer formed with only the transparent ink in an overlapping manner. The protection with respect to the rubbing of the surface of the coloring region 308 in the 3D object 50 and the color degradation can be appropriately carried out by forming the protective region 310. The thickness of the protective region 310 is preferably made to a uniform thickness of, for example, about 10 to 500 µm.

The support layer 52 is a layer for supporting the 3D object 50 being formed. In the present example, the forming device 10 forms the support layer 52 by forming a layer formed with the ink to become the material of the support layer 52 in an overlapping manner. Forming the support layer 52 at the time of forming may be, for example, forming the support layer 52 on at least one part of the periphery of the 3D object 50, when necessary, according to the shape of the 3D object 50 to form.

FIG. 2C is a cross-sectional view showing one example of a configuration of the 3D object 50 formed by the monochromatic/tinting mode, and shows one example of the configuration of the 3D object 50 with the support layer 52. In the present example, when carrying out the forming in the monochromatic/tinting mode, the forming device 10 forms the 3D object 50 configured with only a monochromatic coloring region 312. The support layer 52 is formed on the outer side of the monochromatic coloring region 312.

In this case, the monochromatic coloring region 312 is a region in which a forming layer, which is an ink layer formed with the forming ink of the 3D object 50, is stacked, and configures the shape of the 3D object 50. In the present example, the forming device 10 forms the monochromatic coloring region 312 by forming the ink layer formed using any of the inks of each color (W, T, C, M, Y, K), which is the ink other than the material of the support layer 52, in an overlapping manner. In this case, the monochromatic coloring region 312 is colored to a single color according to the combination of the ink to use.

According to such configuration, for example, the 3D object 50 in which the interior and the surface are colored to a single color can be appropriately formed. More specifically, for example, when the ink of each color is discharged so as to be uniform in a three-dimensional direction in the interior region 302 at a ratio of the white (W) ink of 40%, the transparent ink (T) of 20%, the C color ink of 20%, and the M color ink of 20%, a light blue 3D object 50 can be formed. Even at the time of forming in the monochromatic/tinting mode, the support layer 52 is formed on at least one part of the periphery of the 3D object 50, as necessary.

At the time of forming in the monochromatic/tinting mode, the forming device 10 can form the 3D object 50 at a higher speed by forming the monochromatic coloring region 312 using the inks of a plurality of colors compared to when forming the monochromatic coloring region 312 with only the ink of one color. Considering such characteristics in a more generalized manner, it can be considered as an operation of forming at least one part of the 3D object 50 using the first nozzle row group and the second nozzle row group in the head section 12 (see FIGS. 1A to 1C). In this case, as described in relation to FIGS. 1A to 1C, the material discharging ability of the support nozzle row group can be appropriately prevented from becoming the rate controlling condition of the forming speed by using the configuration in which the material discharging ability of the support nozzle row group is enhanced. Thus, according to the present example, for example, the high speed forming can be appropriately carried out in the monochromatic/tinting mode.

At the time of forming in the monochromatic/tinting mode, the forming device 10 of the present example, for example, carries out forming while coloring the interior and the surface of the forming device 10 with the color automatically set according to the remaining amount of ink. More specifically, for example, when ink of a small remaining amount exists in an ink cartridge or an ink tank of the forming device 10, consideration is made to determine the ink to use so as to avoid the relevant ink. According to such configuration, for example, the ink can be efficiently used to carry out the forming of the 3D object 50. Furthermore, for example, when forming the 3D object 50 of a single color of black, the forming may be carried out while representing black with a combination of Y (yellow), M (magenta), and C (cyan). According to such configuration, for example, the forming can be carried out at a higher speed compared to when carrying out the forming with only black (K color).

In the monochromatic/tinting mode, for example, the 3D object 50 of a color obtained by combining colors from each color of W, T, C, M, Y, K at an arbitrary ratio can be formed. For example, transparent, gray, which is an intermediate concentration produced by a combination of achromatic color of white and black, and furthermore, transparent, light color produced by C, M, Y, and R, G, B, C, M, Y, which are secondary (combination of two colors) colors thereof, transparent, and white, and the like can be represented.

Being able to use the coloring ink also for the purpose of forming is a unique characteristic when, for example, carrying out the forming using the ultraviolet curing type ink, and the like. Thus, in the present example, consideration is made to increase the forming speed using the unique characteristic when carrying out the forming using the ultraviolet curing type ink, and the like. Considering in a more generalized manner without giving consideration to increasing the forming speed, consideration is also made to form the monochromatic coloring region 312 using only one type of ink (single ink), and the like. Thus, for example, in the forming mode of forming the 3D object 50 of a single color without increasing the speed, and the like, the forming device 10 may form the monochromatic coloring region 312 with only one type of ink according to the color selected by the user.

Figure 3:
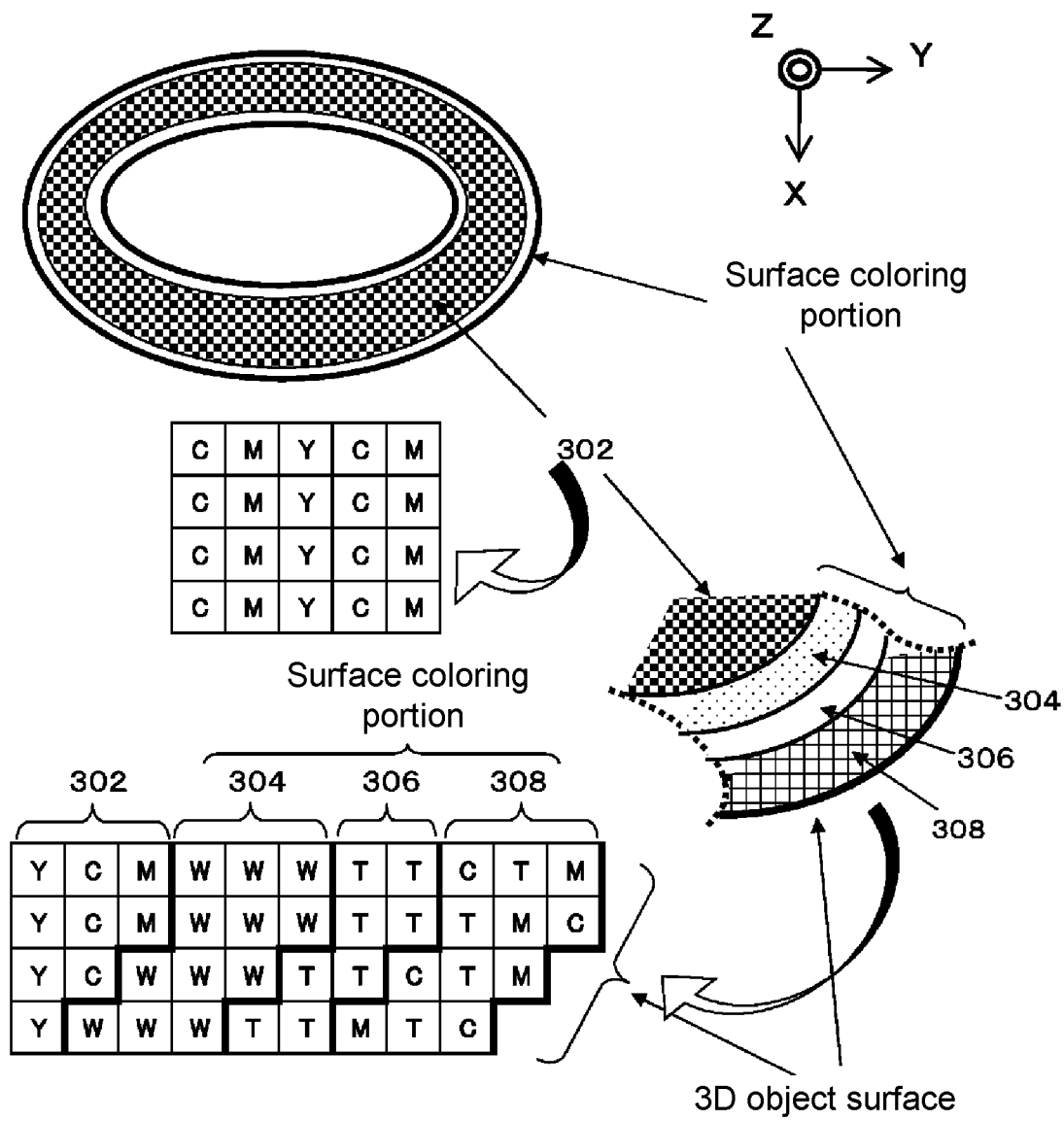
FIG. 3 is a view showing one example of a manner of discharging ink of each color with respect to each region at the time of forming in the surface decoration mode.

Next, a manner of discharging the coloring ink with respect to the interior and the surface of the 3D object 50 will be further described in detail. FIG. 3 is a view showing one example of a manner of discharging the ink of each color with respect to each region at the time of forming in the surface decoration mode, and shows one example of a detailed configuration of each region when forming a doughnut shaped 3D object 50.

When forming the doughnut shaped 3D object 50, a configuration of a three-dimensional pixel (voxel) in one layer configuring the 3D object 50 can be schematically shown as shown in FIG. 3. In this case, one layer is, for example, a layer of one ink at a cross-section (slice plane), which is a plane perpendicular to a stacking direction. The three-dimensional pixel is, for example, a minimum unit configuring the 3D object 50. In the present example, the three-dimensional pixel is, for example, a region formed by one ink droplet.

In FIG. 3, a configuration of when formed with the coloring ink of a plurality of colors is illustrated for the interior region 302. A configuration formed with only the white (W) ink, as described above, is illustrated for the light reflective region 304. A configuration formed with only the transparent ink (T) is illustrated for the separation region 306. A configuration formed using an ink (ink of process color) of each color for coloring and the transparent ink according to the color to color is illustrated for the coloring region 308. In such a configuration, a portion including the light reflective region 304, the separation region 306, and the coloring region 308 can be considered as a surface coloring portion. The protective region 310 (see FIGS. 2A to 2C) is omitted for the sake of convenience of illustration.

In the coloring region 308, it is preferable to form the ink layer same as or similar to when applying an error diffusion method with respect to an in-plane direction (X direction and Y direction) of a layer, for example, based on the information on the color the surface of the 3D object 50 is to be colored, and printing a two-dimensional image through an ink jet method. When using the error diffusion method, a computation time is required, but a high quality coloring (decoration) can be carried out at high resolution. In addition, a method of representing full color includes, for example, dither method, Bayer method, and the like. In such cases, the resolution may lower, for example, as a result of carrying out quantization using a mask, but the image processing can be carried out easily and at high speed. When using any one of the methods, for example, it is preferable to shift a computation position of diffusion in the error diffusion method and a mask position in the dither method for every layer so as not to generate moire. In this case, for example, the mask is preferably shifted in the in-plane direction (X direction and Y direction) of the layer.

When forming the interior, and the like of the 3D object 50 using plural types of inks having different colors from each other, use of various combinations can be considered for a combination of the manner of discharging the respective inks. FIGS. 4A to 4E show various examples of the manner of discharging the ink to the interior of the 3D object 50.

Figures 4A, 4B, 4C, 4D, 4E:
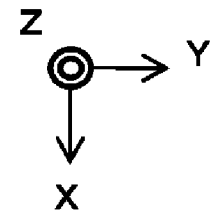
FIGS. 4A to 4E show various examples of the manner of discharging the ink to an interior of the 3D object 50.

FIG. 4A shows an example (example of Y direction continuous) of discharging ink so that the three-dimensional pixel formed with the ink of the same color continues in the main scanning direction (Y direction) and the three-dimensional pixel adjacent in the sub-scanning direction (X direction) is formed with an ink of a different color. FIG. 4B shows an example (example of X direction continuous) of discharging ink so that the three-dimensional pixel formed with the ink of the same color continues in the sub-scanning direction and the three-dimensional pixel adjacent in the main scanning direction is formed with an ink of a different color.

FIG. 4C shows an example (example of two-dimensional dispersion with four heads) of discharging ink so that the three-dimensional pixels formed with each of the inks of four colors is dispersed within a two-dimensional plane. In this case, for the inks of four colors, consideration is made to use the inks of four colors out of the five types of inks including the inks of four colors of CMYK and the transparent ink. In the figure, an example of when the three-dimensional pixel of each color is dispersed within an XY plane is illustrated. The dispersion of the three-dimensional pixel of each color may be carried out not in the XY plane but, for example, in a YZ plane.

FIG. 4D shows an example (example of two-dimensional dispersion with five heads) of discharging ink so that the three-dimensional pixels formed with each of the inks of five colors is dispersed within a two-dimensional plane. In this case, for the inks of five colors, consideration is made to use the five types of inks including the inks of four colors of CMYK and the transparent ink. In this case as well, an example of when the three-dimensional pixel of each color is dispersed within the XY plane is illustrated in the figure. The dispersion of the three-dimensional pixel of each color may be carried out not in the XY plane but, for example, in a YZ plane.

The examples shown in FIGS. 4A to 4D are, for example, examples of the manner of discharging the ink when forming the interior region 302 (see FIGS. 2A to 2C) at the time of forming in the surface decoration mode. Furthermore, at the time of forming in the monochromatic/tinting mode, for example, the monochromatic coloring region 312 (see FIGS. 2A to 2C) may be formed same as or similar to, for example, the examples shown in FIGS. 4A to 4D.

Moreover, consideration is made to carry out the formation of the interior region 302 at the time of forming in the surface decoration mode and the monochromatic coloring region 312 at the time of forming in the monochromatic/tinting mode, for example, so as to represent a predetermined color set in advance. FIG. 4E shows an example of a manner of discharging ink when forming the interior, and the like of the 3D object 50 so as to represent a predetermined color. This example is, for example, an example of a manner of discharging when coloring the interior of the 3D object 50 to a predetermined color. More specifically, the illustrated example is an example of when forming the 3D object 50 of single color of a light green color.

According to the configuration of each example described above, for example, the interior, and the like of the 3D object 50 can be appropriately formed using inks of a plurality of colors. The 3D object 50 thus can be appropriately formed. In each example, the variation in the discharging amount of the ink droplets can be averaged and a 3D object of a satisfactory precision can be obtained by performing scanning so that the discharge from the nozzles of the same ink jet head does not overlap at the same position in the adjacent layers.

Figure 5:
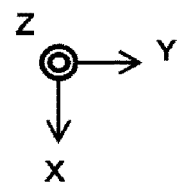
FIG. 5 is a view showing one example of forming one ink layer using inks of a plurality of colors.

Next, an operation of forming one ink layer using the inks of a plurality of colors will be further described in detail. FIG. 5 is a view showing one example of an operation of forming one ink layer using the inks of a plurality of colors, and shows an example of positions to discharge the inks with the plurality of ink jet heads that discharge inks of different colors from each other.

In the illustrated case, three ink jet heads, a first head, a second head, and a third head, that discharge inks of different colors from each other are used for the plurality of ink jet heads. More specifically, for example, when discharging the ink as shown in FIG. 3, each of the first head, the second head, and the third head corresponds to any one of the ink jet heads for the C color, for the M color, and for the Y color. The operation shown in FIG. 5 corresponds to the operation of forming each three-dimensional pixel in one layer configuring the doughnut shaped 3D object 50.

In FIG. 5, each cell indicating the discharging position by the respective ink jet heads represents a recording position by the ink in the layer. In the present example, the recording position is a position (X, Y coordinate position) lined in the X direction and the Y direction at 1/400 inch pitch. The respective ink jet heads discharges the ink according to the data for controlling the coloring while moving in the main scanning direction (Y direction). Furthermore, in the illustrated case, the respective ink jet heads discharges the ink so that an interval in the main scanning direction becomes a three pitch interval.

The number in the cell represents a nozzle row number (L) and a nozzle arrangement number (n). For example, the number Ln in the cell represents the discharge from the $n^{th}$ nozzle in the $L^{th}$ nozzle row. An empty cell represents a position where the ink is not discharged regardless of the data. The operation of forming one ink layer using the inks of a plurality of colors can be appropriately carried out by discharging the ink with each ink jet head as shown in FIG. 5.

Furthermore, in FIG. 5, a case of carrying out the discharge such that the discharging positions by one nozzle row are lined in one row in the X direction is shown. However, the manner of discharging from each nozzle row is not limited to the configuration shown in FIG. 5, and can be variously modified.

Figure 6:
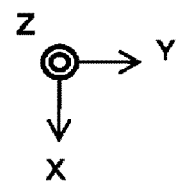
FIG. 6 is a view showing an alternative embodiment of the manner of discharging from each nozzle row.

FIG. 6 shows an alternative embodiment of the manner of discharging from each nozzle row. When configured in such manner, the discharging positions by one nozzle row are not lined in one row, and hence the influence of variation in the discharging amount of the ink between the ink jet heads can be reduced. Furthermore, for example, the high precision forming thus can be more appropriately carried out.

When carrying out the forming with the stacking forming method, the cell at the same position (X, Y coordinate position) of each layer is usually overlapped in the Z axis direction between the different ink layers. On the other hand, for example, the position (discharging position by the same nozzle) of forming the three-dimensional pixel with the same nozzle may be changed for every layer by shifting the position formed with the same nozzle row in each layer every time the layer is changed, and the like. In this case, for example, consideration is made to shift the discharging position in the Y direction every time the layer is changed, and the like. According to such configuration, for example, the three-dimensional pixel overlapping in the stacking direction can be formed with a plurality of nozzles. For example, the influence of variation in the discharging amount of the ink for every nozzle can be appropriately suppressed.

Figure 7:
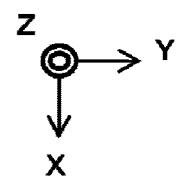
FIG. 7 is a view showing one example of an operation when a position of forming a three-dimensional pixel with the same nozzle row is differed for every layer.

FIG. 7 is a view showing one example of an operation of when differing the position of forming the three-dimensional pixel with the same nozzle row for every layer, and shows one example of a nozzle for forming the three-dimensional pixel at each position with respect to three layers, $n^{th}$ layer, $n+1^{th}$ layer, $n+2^{th}$ layer, continuously overlapped in the stacking direction (Z direction).

In this case, the discharging position is changed so as not to be discharged to the same XY coordinate position from the same nozzle between at least two continuing layers. More specifically, for example, focusing on the cell of the coordinate (Y5, X3) in the figure, the three-dimensional pixel is formed with the second nozzle of the third nozzle row when forming the $n^{th}$ layer, and the three-dimensional pixel is formed with other nozzles when forming the $n+1^{th}$ layer and the $n+2^{th}$ layer. Thus, at the relevant coordinate position, the ink is discharged from three different nozzles with respect to the three layers. This is similar for each of the other coordinates.

When discharging the ink with the ink jet method, variation of a certain extent usually exists in the discharging amount (capacity per one ink droplet) of the ink from each nozzle. More specifically, the variation in the discharging amount between the nozzles is, for example, about 10%. Thus, when the ink is discharged in an overlapping manner to the same position with the same nozzle, the ink becomes thick in the stacking direction with the nozzles of large discharging amount and becomes thin in the stacking direction with the nozzles of small discharging amount, and the forming becomes that of poor precision having unevenness overall. On the contrary, when the ink is discharged as shown in FIG. 7, the ink is not discharged with the same ink jet head to the same position of X, Y coordinate in the operation of forming the continuous ink layers (forming layer, etc.) using the plurality of ink jet heads. In this case, the variation in the discharging amount between the nozzles is averaged by stacking the ink layers. More specifically, for example, focusing on the illustrated three layers, the height of the ink can be averaged by discharging ink from three different ink jet heads with respect to the same position. In this case, the height of stacking becomes more uniformed, so that a scraped amount (removed amount of ink) by surface smoothening of the flattening roller 106 (see FIGS. 1A to 1C) can also be reduced. The usage amount of the ink thus can be saved.

The specific forming manner carried out by the forming device 10 is not limited to the method described above, and can be further variously changed. For example, the number of nozzle rows configuring the respective nozzle groups can be variously changed. In this case, for example, the precision of forming can be enhanced and the speed of forming can be increased by increasing the number of nozzle rows. The number of nozzle rows in one ink jet head can also be variously changed.

In the description made above, the configuration of not discharging to the same XY coordinate position from the same nozzle between the two continuous layers has been described using FIG. 7 for the interior, and the like of the 3D object 50. With regards to this, when using the plurality of ink jet heads 102S (see FIGS. 1A to 1C) as in the present example, the configuration of not discharging to the same XY coordinate position from the same nozzle between the two continuous layers may be similarly adopted even when forming the support layer 52.

The manner of forming each region configuring the 3D object 50 can also be variously changed. For example, when carrying out forming in the surface decoration mode using the transparent ink (T color) having low transparency, and the like, consideration is also made to carry out forming without clarifying the boundary of the light reflective region 304 and the separation region 306, and the like.

Figure 8:
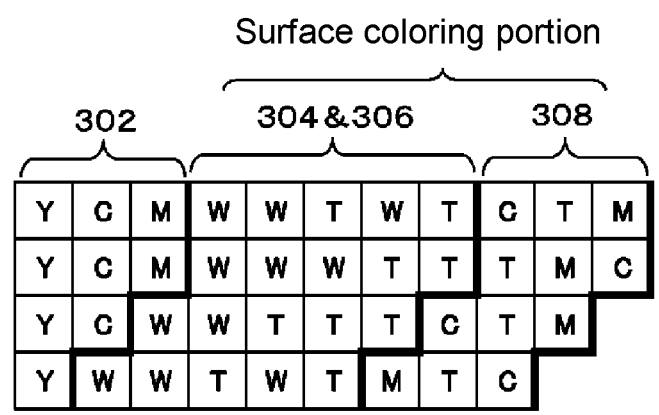
FIG. 8 shows an example of carrying out forming without clarifying a boundary of a light reflective region 304 and a separation region 306.

FIG. 8 shows an example of carrying out forming without clarifying the boundary of the light reflective region 304 and the separation region 306. In this case, consideration can be made to giving a gradation in the concentration of the white (W) ink and the transparent ink (T) for a region that functions as the light reflective region 304 and the separation region 306. The forming in the surface decoration mode can be appropriately carried out even in the case configured as above.

Furthermore, in the description made above, the description has been mainly made on the configuration of enhancing the material discharging ability of the support nozzle row group. However, it is sometimes preferable to enhance the material discharging ability for the nozzle row group other than the support nozzle row group depending on the characteristics of the forming mode executed in the forming device 10. More specifically, for example, an ink used in the 3D object heads of the head section 12 includes a transparent ink, which is colorless and transparent. The transparent ink is used when forming a transparent region such as, for example, the protective region 310 (see FIGS. 2A to 2C) in the 3D object 50. In order to form such transparent region, only the transparent ink needs to be used without using other colored inks. Thus, it is sometimes preferable to enhance the material discharging ability of the transparent ink nozzle row group depending on the forming mode executed in the forming device 10. An example of such forming mode will be described below.

Figure 9A:
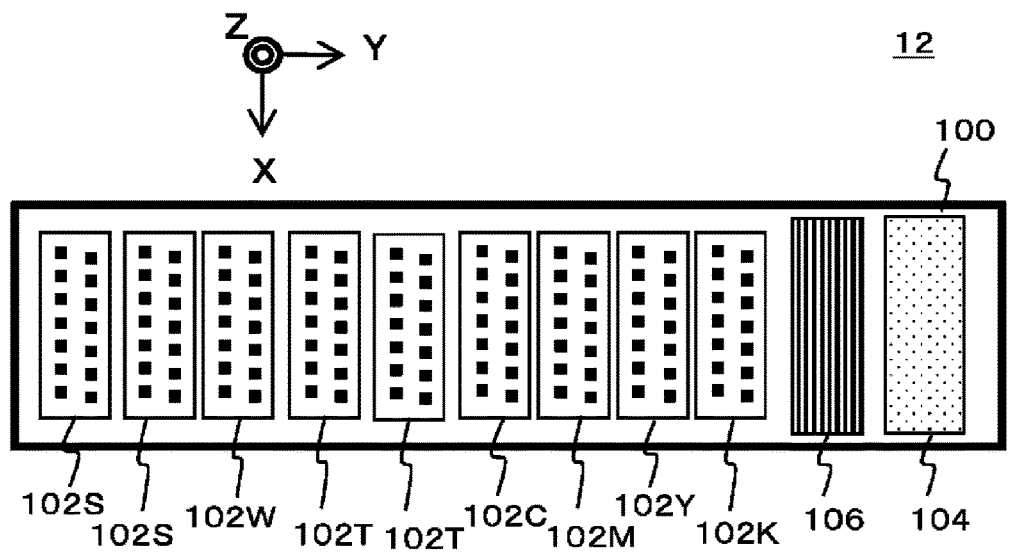
FIGS. 9A to 9C are drawings describing a forming mode in which a material discharging ability of a transparent ink nozzle row group is preferably enhanced.
Figure 9B:
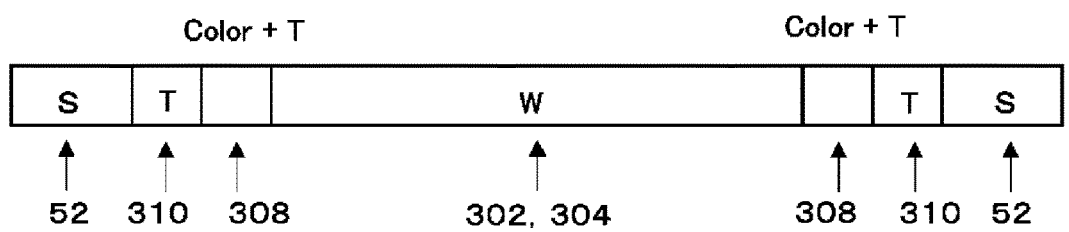
Figure 9C:
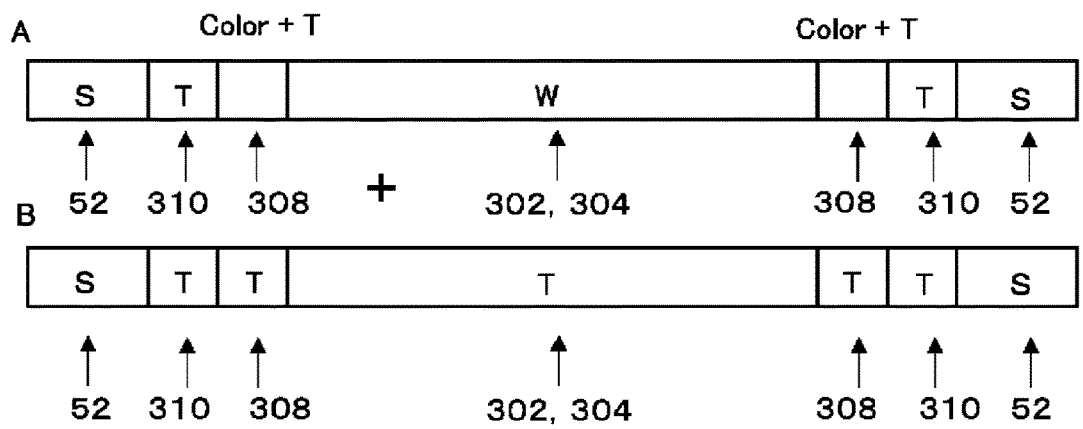

FIGS. 9A to 9C are a view describing a forming mode in which the material discharging ability of the transparent ink nozzle row group is preferably enhanced. Other than the points described below, the configuration denoted with the same reference signs as FIGS. 1 to 8 in FIGS. 9A to 9C has characteristics same as or similar to the configurations in FIGS. 1 to 8.

FIG. 9A shows one example of a configuration of the head section 12 when the material discharging ability of the transparent ink nozzle row group is enhanced. In this configuration, the head section 12 includes one more ink jet heads 102T for transparent ink compared to the head section 12 shown in FIG. 1B. The material discharging ability of the transparent ink nozzle row group is thus made greater than the other nozzle row groups that discharge each ink for forming of the 3D object 50. More specifically, in this case, the material discharging ability of the transparent ink nozzle row group is greater than the respective material discharging ability of the white ink nozzle row group, the C color nozzle row group, the M color nozzle row group, the Y color nozzle row group, and the K color nozzle row group.

In this case as well, the head section 12 includes two ink jet heads 102S. Thus, the material discharging ability of the transparent ink nozzle row group is equal to the material discharging ability of the nozzle row group other than the support nozzle row group. When referring to the material discharging ability being equal, for example, this means that the material discharging ability is substantially equal. When referring to the material discharging ability being substantially equal, for example, this may mean that the design material discharging ability is equal.

FIGS. 9B and 9C show one example of a forming mode of carrying out the forming using the head section 12 shown in FIG. 9A. In this configuration, the forming device 10 can execute, for the forming mode of forming the 3D object 50, plural types of surface decoration modes in which at least the speed of forming is different from each other. More specifically, the forming device 10 can execute a first surface decoration mode of carrying out coloring using the coloring inks of a plurality of colors with respect to the surface of the 3D object 50 same as or similar to the case described using FIG. 2B and the like, and a second surface decoration mode of carrying out the forming at a higher speed than the first surface decoration mode while carrying out coloring using the coloring inks of a plurality of colors with respect to the surface of the 3D object 50.

FIG. 9B shows one example of an operation of forming in the first surface decoration mode. As described above, the first surface decoration mode is a forming mode of carrying out the forming same as or similar to the case described using FIG. 2B, and the like. In this case, the forming device 10 forms each region of the 3D object 50 same as or similar to, for example, the operation of forming described using FIGS. 2 and 3.

In FIG. 9B, the configuration of when forming the 3D object 50 with the separation region 306 (see FIGS. 2A to 2C) omitted is illustrated, for the sake of simplifying the illustration. In this case as well, however, the separation region 306 may be further formed between the light reflective region 304 and the coloring region 308. With respect to the interior region 302, a case of forming the relevant region with the white ink rather than with the coloring ink (ink of each color of CMYK) is illustrated. Thus, in the illustrated configuration, the interior region 302 is formed with the white ink in continuation to the light reflective region 304. In this case as well, the interior region 304, the light reflective region 304, and the coloring region 30 can be considered as being lined in such order from the inner side toward the outer side of the 3D object 50. Furthermore, the protective region 310 is formed on the outer side of the coloring region 308 using only the transparent ink. The interior region 302 may be formed using the coloring ink, similar to the case described with FIGS. 2 and 3, for example.

At the time of forming in the first surface decoration mode, the forming device 10 forms the light reflective region 304 using only the white ink, similar to the case described with FIGS. 2 and 3. Similar to the case described with FIGS. 2 and 3, the coloring region 308 is formed using the coloring ink and the transparent ink. In this case, for example, the color and the concentration are adjusted by the combination of the ink of each color and the transparent ink.

On the contrary, at the time of forming in the second surface decoration mode, the manner of forming the light reflective region 304, and the like is differed from the time of forming in the first surface decoration mode. The forming device 10 thus carries out the forming under a condition partially different from the first surface decoration mode, and carries out the forming at a higher speed than the first surface decoration mode while carrying out coloring with respect to the 3D object 50 in the second surface decoration mode.

FIG. 9C shows one example of the operation of forming in the second surface decoration mode. In the second surface decoration mode, the forming can be carried out at a higher speed than the first surface decoration mode by having the total amount of ink discharged in one main scanning operation greater than in the first surface decoration mode.

More specifically, at the time of forming in the first surface decoration mode, the light reflective region 304, and the like are formed using only the white ink, as described above. Thus, the maximum amount of ink that can be discharged in one main scanning operation to a position where the light reflective region 304 is to be formed is determined according to the material discharging ability of the white ink nozzle row group. Furthermore, the material discharging ability of the white ink nozzle row group becomes a factor for determining the upper limit of the forming speed.

On the contrary, at the time of forming in the second surface decoration mode, the light reflective region 304, which is formed with only one type of ink (white ink) in the first surface decoration mode, is formed by further using the transparent ink in addition to the white ink. In this case, the maximum amount of ink that can be discharged in one main scanning operation to the position where the light reflective region 304 is to be formed increases, whereby the forming can be carried out at a higher speed.

When forming the interior region 302 with only the white ink in the first surface decoration mode as in the illustrated case, the interior region 302 is also formed using the white ink and the transparent ink at the time of forming in the second surface decoration mode. Furthermore, when forming the interior region 302 using the coloring inks of a plurality of colors, for example, the interior region 302 may be formed without using the transparent ink.

Moreover, at the time of forming in the second surface decoration mode, the manner of forming the coloring region 308 is preferably differed from the first surface decoration mode. In this case, for example, the coloring region is formed using the transparent ink at a greater ratio in the second surface decoration mode, compared to the time of forming in the first surface decoration mode.

More specifically, at the time of forming in the second surface decoration mode, each region is formed so as to discharge an additional ink with respect to the ink discharged in the first surface decoration mode. In this case, the ink discharged in the first surface decoration mode is an ink discharged to each region as in the configuration denoted with a reference sign A in FIG. 9C. The additional ink is an ink discharged to each region as in the configuration denoted with a reference sign B in FIG. 9C.

In FIG. 9C, the ink discharged in one main scanning operation is illustrated in a manner divided to the configuration of the reference sign A and the configuration of the reference sign B, for the sake of convenience of illustration. However, at the time of the actual forming, the ink corresponding to both reference signs A, B is discharged during the one main scanning operation based on the forming data. Thus, the maximum amount of ink that can be discharged in one main scanning operation in the second surface decoration mode is twice of that in the case of the first surface decoration mode.

In the second surface decoration mode, the moving amount in the stacking direction scanning (Z scanning) is made greater than in the first surface decoration mode in accordance with the increase in the amount of ink discharged in one main scanning operation. In this case, more specifically, consideration is made to have the moving amount in the stacking direction scanning in the second surface decoration mode twice the moving amount in the first surface decoration mode. According to such configuration, for example, the forming speed in the second surface decoration mode can be appropriately increased. Furthermore, the forming of carrying out coloring in full color, for example, thus can be appropriately carried out at high speed.

As described above, in the second surface decoration mode, the protective region 310 is formed with only the transparent ink discharged from the ink jet head 102T. The support layer 52 is formed with only the material of the support layer 52 discharged from the ink jet head 102S. Thus, if the material discharging ability of the transparent ink nozzle row group and the support nozzle row group is insufficient, the forming speed in the second surface decoration mode cannot be appropriately increased. On the contrary, in the configuration shown in FIGS. 9A to 9C, the material discharging ability of the transparent ink nozzle row group and the support nozzle row group is made greater than the material discharging ability of the other nozzle groups, as described above. The forming speed in the second surface decoration mode thus can be increased.

The second surface decoration mode enables high speed forming, but differs from the first surface decoration mode in the manner of forming the light reflective region 304 and the coloring region 308. As a result, the way the color the 3D object 50 is colored is viewed, and the like is also assumed to be different from the first surface decoration mode. For example, consideration is made that the concentration of the color at the time of forming in the second surface decoration mode becomes lighter than at the time of forming in the first surface decoration mode with respect to the color of the coloring region 308. Consideration is also made that a yellow component, and the like may generate in the shade of the light reflective region 304, for example, by adding the clear into to form the light reflective region 304.

Thus, consideration is made to use the second surface decoration mode, which is the higher speed forming mode, for example, in applications where greater importance is placed on enhancing the forming speed than the quality such as color reproducibility, and the like. In this case, in applications where high color reproducibility is desired, the forming is preferably carried out in the first surface decoration mode, which is the forming mode having higher color reproducibility. In the forming device 10, each of the first surface decoration mode and the second surface decoration mode is preferably selectable according to the application, and the like.

Furthermore, as described above, in such configuration, the material discharging ability of the transparent ink nozzle row group is equal to the material discharging ability of the support nozzle row group. Furthermore, the material discharging ability of the transparent ink nozzle row group and the support nozzle row group is greater than the nozzle row group, and the like of each color for coloring or the other nozzle row groups. Thus, CT=CSP>Cc is satisfied, where CT is the material discharging ability of the transparent ink nozzle row group, CSP is the material discharging ability of the nozzle row group other than the support nozzle row group, and Cc is the material discharging ability of the nozzle row group for coloring for one color. In this case, the nozzle row group for coloring for one color is one of the C color nozzle row group, the M color nozzle row group, the Y color nozzle row group, and the K color nozzle row group. Moreover, in this case, the CT and the CSP are preferably greater than or equal to twice the Cc. In consideration to increasing the forming speed in the second surface decoration mode within a range the size of the head section 12 does not become too large, the CT and the CSP are preferably made to about twice the Cc in terms of practicality. According to such configuration, for example, the forming speed in the second surface decoration mode can be appropriately increased to about twice the forming speed in the first surface decoration mode.

When carrying out the forming with the stacking forming method, the 3D object 50 is formed by overlapping layers, with an ink layer (unit layer) corresponding to slice data indicating the cross-sectional shape of the 3D object 50, as a unit of forming. When forming the unit layer, the ink is discharged such that the amount of ink per unit area becomes constant. More specifically, for example, when carrying out the forming in the first surface decoration mode, the unit layer is formed, for example, such that an ink droplet (liquid droplet) corresponding to five drops lands on the unit area, by way of example. In this case, two drops of ink droplets of coloring ink are landed and three drops of ink droplets of transparent ink are landed, for example, with respect to the coloring region 308, which is the portion to be colored in full color, so that a total number of landing becomes constant. In this case, the ratio of the number of drops of the ink droplets to be landed on the coloring region 308 changes according to the color and the concentration. Furthermore, the ink droplets of a necessary number of drops (e.g., five drops) are landed on the support layer 52, the light reflective region 304, and the like with only one type (alone) of ink used to form the relevant region.

In this case, for example, the discharging amount (number of drops) of the ink in each region needs to be the same to form the unit layer of a constant thickness. Thus, if the material discharging ability of the nozzle row group used to form any of the regions is small, the thickness (pitch) of the unit layer cannot be increased according to the conditions capable of forming the relevant region. As a result, the forming becomes difficult to carry out at high speed. In this case, for example, the speed of forming can be increased by enhancing the material discharging ability of all the nozzle row groups. In this case, however, problems such as enlargement of the head section 12 and the forming device 10, as well as increase in cost arise, as described above.

On the other hand, when configured as described above, the high speed forming in full color becomes possible by enhancing the material discharging ability of only some nozzle row groups rather than enhancing the material discharging ability of all the nozzle row groups. Thus, according to such configuration, for example, the forming in full color can be appropriately carried out at a higher speed while appropriately suppressing the problems of enlargement of the head section 12 and the forming device 10 as well as increase in cost.

Considering the configuration shown in FIGS. 9A to 9C in a more generalized manner, when forming a region of one part in the 3D object 50 with only one type of ink and forming a region of another part with plural types of inks in one of the forming modes, it can be considered preferable to have the material discharging ability of the nozzle row group that discharges the one type of ink greater than the material discharging ability of the nozzle row group that discharges the ink used only to form the region of another part. According to such configuration, the forming speed in the relevant forming mode can be appropriately increased.

Figure 10A:
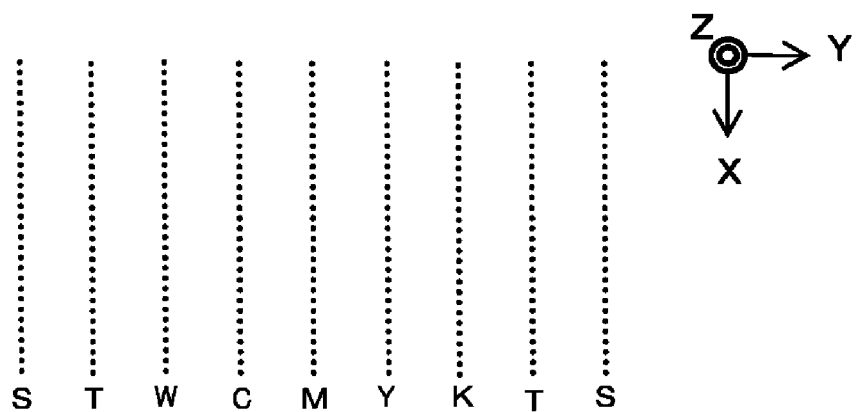
FIGS. 10A to 10C are drawings describing a method of enhancing the material discharging ability of the nozzle row group.
Figure 10B:
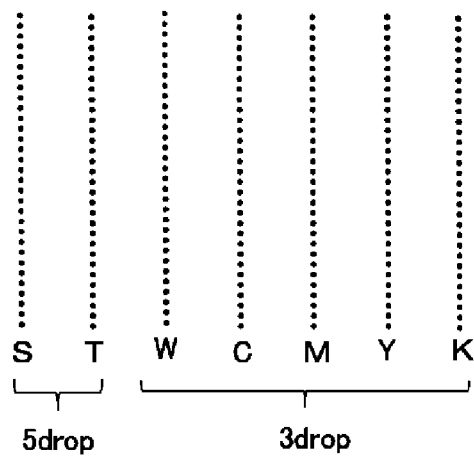
Figure 10C:
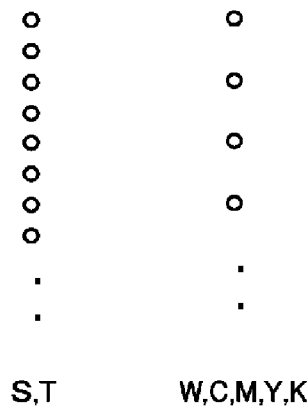

Next, an alternative embodiment, and the like will be described for a method of enhancing the material discharging ability of the nozzle row group. FIGS. 10A to 10C are a view describing a method of enhancing the material discharging ability of the nozzle row group. FIG. 10A shows one example of a method of enhancing the material discharging ability of the nozzle row group.

The arrangement of each ink jet in the head section 12 (see FIGS. 9A to 9C) is not limited to the configuration shown in FIG. 9A, and the like, and can be variously changed. FIG. 10A is a view showing an alternative embodiment of a manner of arrangement of the nozzle row, and shows, in a simplified manner, one example of an arrangement of a plurality of nozzle rows of the head section 12. In the figure, dotted lines denoted with symbols S, T, W, C, M, Y, and K show, in a simplified manner, a nozzle row in each of the ink jet head 102S, the ink jet head 102T, the ink jet head 102W, the ink jet head 102C, the ink jet head 102M, the ink jet head 102Y, and the ink jet head 102K. The nozzle row in the figure may be, for example, a nozzle row in which a plurality of nozzle rows of one ink jet head is collectively shown.

The configuration shown in FIG. 10A is an example of when the material discharging ability of the support nozzle row group and the transparent ink nozzle row group is made greater than the other nozzle row groups by increasing the number of ink jet heads 102S and the ink jet heads 102T, assuming the material discharging ability per one ink jet head is equal. More specifically, in this case, the number of ink jet heads 102S and ink jet heads 102T is two, and the number of other ink jet heads is one. According to such configuration, for example, the number of nozzle rows in the support nozzle row group and the transparent ink nozzle row group can be made greater than the number of nozzle rows in the other nozzle row groups. The material discharging ability of the support nozzle row group and the transparent ink nozzle row group thus can be made greater than the other nozzle row groups.

In this case, each of the two ink jet heads 102S is arranged in a so-called mirror arrangement so as to sandwich the other ink jet heads in between in the main scanning direction. Furthermore, each of the two ink jet heads 102T is also arranged in mirror arrangement so as to sandwich the other ink jet heads in between on the inner side of the respective ink jet heads 102S. Even when configured in such manner, the forming in the first surface decoration mode and the second surface decoration mode can be appropriately carried out.

FIG. 10B shows another example of a method of enhancing the material discharging ability of the nozzle row group. In order to enhance the material discharging ability of the nozzle row group, for example, consideration is made to increase the number of ink droplets (number of liquid droplets) discharged from the nozzle row group per unit time. For example, defining the maximum number of liquid droplets that can be discharged from one nozzle per unit time in the main scanning operation as a number of unit time liquid droplets, consideration is made to have the number of unit time liquid droplets of each nozzle in the nozzle row of the support nozzle row group and the transparent ink nozzle row group greater than the number of unit time liquid droplets of each nozzle in the nozzle row of the other nozzle row groups. In this case, the number of nozzle rows configuring the support nozzle row group and the transparent ink nozzle row group may be the same as the other nozzle row groups.

More specifically, as shown in FIG. 10B, for when the number of nozzle rows included in the respective nozzle row groups is the same, an example in which the nozzles of the support nozzle row group and the transparent ink nozzle row group discharge five drops (5 drops) of ink droplets per unit time, and the nozzles of the other nozzle row groups discharge three drops of ink droplets per unit time is shown. Even when configured in such manner, for example, the material discharging ability of the support nozzle row group and the transparent ink nozzle row group can be made greater than that of the other nozzle row groups. The forming in the first surface decoration mode and the second surface decoration mode thus can be appropriately carried out.

In this case, the moving speed of the head section 12 at the time of the main scanning operation may be slowed in accordance with the ability of the ink jet head for discharging five drops per unit time. In this case, the landing precision of the ink droplet enhances by the lowering of the moving speed, whereby the forming can be carried out at a higher precision.

FIG. 10C shows another further example of a method of enhancing the material discharging ability of the nozzle row group. In order to enhance the material discharging ability of the nozzle row group, for example, consideration can also be made to increasing the number of nozzles configuring the nozzle row. For example, consideration is made to have the number of nozzles configuring the respective nozzle rows in the support nozzle row group and the transparent ink nozzle row group greater than the number of nozzles configuring the respective nozzle rows in the other nozzle row groups. Even when configured in such manner, for example, the material discharging ability of the support nozzle row group and the transparent ink nozzle row group can be made greater than that of the other nozzle row groups. The forming in the first surface decoration mode and the second surface decoration mode thus can be appropriately carried out.

Next, a supplemental explanation, and the like will be made on the configuration, and the like of the forming device 10. First, a supplemental explanation will be made on a reason the high speed forming can be carried out in the forming device 10 of the present example. When carrying out forming with the stacking forming method using the ink jet head, for example, only the ink (forming ink) for forming of a single color and the ink for the material (support material) of the support layer are to be used when carrying out only the forming with a single color. Thus, in this case, for example, the forming can be carried out using only two types of ink jet heads.

When coloring the surface of the 3D object 50 in full color, the ink of each color (e.g., for four colors of C, M, Y, K) of at least the process color usually needs to be used. Thus, for example, extra ink jet head becomes necessary by the number of coloring inks (color inks) to use compared to the forming device that carries out only the forming with a single color.

However, even using the forming device capable of performing coloring in full color includes a case of forming the 3D object in which coloring is unnecessary and the 3D object on which only the coloring with the single color is carried out. The inventors of the present application considered increasing the forming speed by effectively using the ink jet head for coloring in such a case. More specifically, as already described above, a plurality of forming modes can be executed in the forming device 10, and other than the surface decoration mode, which is the forming mode for coloring the surface of the 3D object 50 in full color, the forming in the forming mode such as the monochromatic/tinting mode enabling higher speed forming can be carried out. With regards to the forming mode of carrying out such high speed forming, the forming speed can be appropriately increased by enhancing the material discharging ability of the support nozzle row group.

In this case, the coloring in the monochromatic/tinting mode is carried out using the same ink jet head as used for the full color coloring (full color decoration) in the surface decoration mode. In the monochromatic/tinting mode, for example, the ink is preferably discharged in the same pattern from the same ink jet head for both the surface and the interior of the 3D object.

Next, a supplemental explanation is made on the configuration of the forming device 10. Considering the configuration of the forming device 10 in a more generalized manner, for example, a configuration for discharging the ink to become the material (forming material) of the 3D object 50 and the ink to become the material (support material) of the support layer 52 can be considered. In this case, the plurality of ink jet heads in the head section 12 can be broadly divided to two types, the support layer head (for support material discharging) and the 3D object head (for forming material discharging), as also shown in FIG. 1B. In this case, for example, the ink of one of the colors of C, M, Y, K, T, W is used for the material of the 3D object 50. Furthermore, the ultraviolet curing type ink is preferably used in at least the 3D object head.

With respect to the configuration of the forming device 10, for example, a configuration including the plurality of nozzle rows configured from one or more number of ink jet heads arrayed in a first direction that discharge the same ink can be considered. The first direction is, for example, the sub-scanning direction. In this case, for example, the ink is discharged on the basis of the forming data from the plurality of nozzle rows of the plurality of ink jet heads while scanning in a second direction, which forms a predetermined angle with respect to the first direction. The second direction is, for example, the main scanning direction. In this case, it is preferable to form one layer by discharging the ink so that the discharged ink from the plurality of nozzle rows do not overlap at the same position in the scanning in the second direction. In this case, the discharged ink from the same nozzle of the plurality of nozzle rows is preferably prevented from overlapping at the same position between the adjacent layers of at least one part.

Next, a supplemental explanation will be made on the material discharging ability, and the like of the support nozzle row group. With regards to the characteristics related to the material discharging ability of the support nozzle row group, consideration is made to have the number of support layer heads greater than the number of ink jet heads for one type of (single) ink in the 3D object head, as described using, for example, FIG. 10A, and the like. Furthermore, for example, consideration is also made to increase the number of ink droplets discharged per unit time, as described using FIG. 10B, and the like, and having the number of nozzles in the nozzle row of the support layer head greater than the number of nozzles in the nozzle row of one ink jet head in the 3D object head, and the like, as described using FIG. 10C, and the like.

As described above, a water soluble material, for example, is used for the material of the support layer 52 so as to be dissolution removed with water after the forming. On the contrary, a non-water soluble material is preferably used for the material of the 3D object 50. In this case, when the support layer 52 is formed by further using the ink jet heads for the 3D object other than the ink jet heads 102S, the support layer 52 may become difficult to remove after the completion of the forming. Thus, it is difficult to increase the speed using the ink jet head for other intended purposes for the operation of forming the support layer 52. In the present example, therefore, the support layer 52 can be formed at a higher speed by enhancing the material discharging ability of the support nozzle row group, as described above.

More specifically, in the case of the operation of forming each region of the 3D object 50, for example, all inks other than the material of the support layer 52 can be used if the color is not taken into consideration. In this case, the speed of forming can be increased by the number of usable inks, that is, the number of ink jet heads (or nozzle row groups). Thus, for example, if each region of the 3D object 50 is formed using two of the 3D object heads other than the ink jet heads 102S, the forming can be carried out at a speed of twice the speed of when only one head is used.

However, if the number of ink jet heads 102S used to form the support layer 52 is only one in this case, the forming speed of the support layer 52 becomes slow, and the entire forming operation cannot be doubled. In the present example, on the other hand, the entire forming operation can be double by having the number of ink jet heads 102S as two. Considering in a more generalized manner, when forming the 3D object 50 using N types of inks of the same resolution and the same number of nozzles, that is, when using N ink jet heads for the 3D object heads, the speed of the entire forming operation becomes the speed of N times by using N ink jet heads 102S of the same resolution and the same number of nozzles.

The present disclosure can be suitably used in, for example, a forming device.

What is claimed is:

1. A forming method for forming a 3D object by discharging a material from a nozzle row in which a plurality of nozzles are lined in a nozzle row direction, the forming method comprising:
   causing a head section including the plurality of nozzle rows to perform a scanning operation of discharging a material of the 3D object while relatively moving with respect to the 3D object being formed; wherein
   the head section includes, for the plurality of nozzle rows,
   a first nozzle row group including one or more nozzle rows that discharge a material of a first color for the material of the 3D object,
   a second nozzle row group including one or more nozzle rows that discharge a material of a second color different from the first color for the material of the 3D object,
   a transparent ink nozzle row group including one or more nozzle rows that discharge a transparent material, and
   a support nozzle row group including one or more nozzle rows that discharge a material of a support layer that supports a periphery of the 3D object being formed;
   the molding method carries out an operation of forming based on a forming mode set in advance, and forms at least one part of the 3D object using the first nozzle row group and the second nozzle row group and forms the support layer on at least one part of the periphery of the 3D object in an operation of at least one of the forming modes; and
   in one scanning operation, a material discharging ability of the support nozzle row group is greater than a material discharging ability of the first nozzle row group, a material discharging ability of the transparent ink nozzle row group is greater than the material discharging ability of the first nozzle row group, and the material discharging ability of the transparent ink nozzle row group is equal to the material discharging ability of the support nozzle row group, wherein the material discharging ability is defined as a maximum value of an amount of a material that is discharged onto a unit area in a unit time in the one scanning operation,
   wherein the first nozzle row group discharges a coloring material and a light reflective material,
   a coloring region is formed by the discharged coloring material, a light reflective region is formed by the discharged light reflective material, and
   a representation of color having a sufficient thickness to represent a full color is obtained by a subtractive color mixing in which the light reflective region is formed on an inner side of the coloring region in an overlapping manner, and the light reflective region and the coloring region are formed in an overlapping manner.

2. The forming method according to claim 1, wherein a number of the nozzle rows in the support nozzle row group is greater than a number of the nozzle rows in the first nozzle row group.

3. The forming method according to claim 1, wherein a number of the nozzles configuring the respective nozzle rows in the support nozzle row group is greater than a number of the nozzles configuring the respective nozzle rows in the first nozzle row group.

4. The forming method according to claim 1, wherein defining a maximum number of liquid droplets dischargeable from one nozzle per unit time in the scanning operation as a number of unit time liquid droplets, the number of unit time liquid droplets of the nozzle in the nozzle row of the support nozzle row group is greater than the number of unit time liquid droplets of the nozzle in the nozzle row of the first nozzle row group.

5. The forming method according to claim 1, wherein the nozzle row of the first nozzle row group discharges a forming ink of a predetermined color or an ink having light reflectivity.

6. The forming method according to claim 1, wherein the forming mode colors at least a surface of the 3D object using a coloring ink of a plurality of colors; and
   the nozzle row in the second nozzle row group discharges any of the coloring inks of the plurality of colors.

7. The forming method according to claim 1, wherein the material discharging ability of the support nozzle row group is greater than the material discharging ability of the second nozzle row group.

8. The forming method according to claim 1, wherein the forming mode comprises, at least
   a surface decoration mode of carrying out coloring with respect to a surface of the 3D object, which is a region visually recognizable from outside in the 3D object, using a coloring ink of a plurality of colors, and
an interior coloring mode of carrying out forming at a higher speed than the surface decoration mode by using at least one of the coloring inks for the forming of the interior of the 3D object; and
in the operation of the interior coloring mode, at least one part of the 3D object is formed using the first nozzle row group and the second nozzle row group and the support layer is formed on at least one part of a periphery of the 3D object.

9. The forming method according to claim 8, wherein the nozzle row of the first nozzle row group discharges any one of the coloring inks of the plurality of colors; and
the nozzle row of the second nozzle row group discharges any one of the other coloring inks of the plurality of colors.

10. The forming method according to claim 8, wherein the nozzle row of the first nozzle row group discharges a forming ink of a predetermined color or an ink having light reflectivity; and
the nozzle row of the second nozzle row group discharges any one of the coloring inks of the plurality of colors.

11. The forming method according to claim 1, wherein the forming mode comprises, at least
a first surface decoration mode of carrying out coloring on a surface of the 3D object, which is a region visually recognizable from outside in the 3D object, using a coloring ink of a plurality of colors, and
a second surface decoration mode of carrying out forming at a higher speed than the first surface decoration mode while performing coloring on the surface of the 3D object using the coloring inks of the plurality of colors;
the nozzle row of the first nozzle row group discharges an ink having reflectivity;
the nozzle row of the second nozzle row group discharges any one of the coloring inks of the plurality of colors;
the material discharging ability of the transparent ink nozzle row group is greater than the material discharging ability of the second nozzle row group;
at the time of forming in the first surface decoration mode and the second surface decoration mode, the forming method forms an interior region configuring an interior of the 3D object, a light reflective region formed using at least the ink having light reflectivity, and a coloring region colored by the coloring ink so as to be lined in such order from an inner side toward an outer side of the 3D object;
at the time of forming in the first surface decoration mode, the light reflective region is formed using the ink having light reflectivity and without using the transparent ink; and
at the time of forming in the second surface decoration mode, the light reflective region is formed using the ink having light reflectivity and the transparent ink.

12. The forming method according to claim 11, wherein at the time of forming in the first surface decoration mode and the second surface decoration mode, the coloring region is formed using the coloring ink of the plurality of colors and the transparent ink; and
with respect to a ratio in usage amount of the coloring ink and the transparent ink in forming the coloring region, the transparent ink is used at a greater ratio at the time of forming in the second surface decoration mode than at the time of forming in the first surface decoration mode.

13. A forming method of forming a 3D object by discharging a material from a nozzle row in which a plurality of nozzles are lined in a nozzle row direction, the forming method comprising:
causing a head section including the plurality of nozzle rows to perform a scanning operation of discharging a material of the 3D object while relatively moving with respect to the 3D object being formed; wherein
the head section includes, for the plurality of nozzle rows,
a first nozzle row group including one or more nozzle rows that discharge a material of a first color for the material of the 3D object,
a second nozzle row group including one or more nozzle rows that discharge a material of a second color different from the first color for the material of the 3D object,
a transparent ink nozzle row group including one or more nozzle rows that discharge a material of a third color different from the first color and the second color for the material of the 3D object; and
a support nozzle row group including one or more nozzle rows that discharge a material of a support layer that supports a periphery of the 3D object being formed;
a forming device used to form the 3D object executes, for a forming mode, at least
a first surface decoration mode of carrying out coloring on a surface of the 3D object, which is a region visually recognizable from outside in the 3D object, using a coloring ink of a plurality of colors, and
a second surface decoration mode of carrying out forming at a higher speed than the first surface decoration mode while performing coloring on the surface of the 3D object using the coloring inks of the plurality of colors;
the nozzle row of the first nozzle row group discharges an ink having reflectivity;
the nozzle row of the second nozzle row group discharges any one of the coloring inks of the plurality of colors;
the nozzle row of the transparent ink nozzle row group discharges a transparent ink;
defining a maximum value of an amount of a material that is discharged onto a unit area in a unit time in one scanning operation as a material discharging ability, the material discharging ability of the support nozzle row group is greater than the material discharging ability of the first nozzle row group, the material discharging ability of the transparent ink nozzle row group is greater than the material discharging ability of either the first nozzle row group or the second nozzle row group, and the material discharging ability of the transparent ink nozzle row group is equal to the material discharging ability of the support nozzle row group;
at the time of forming in the first surface decoration mode and the second surface decoration mode, the forming device is caused to form an interior region configuring an interior of the 3D object, a light reflective region formed using at least the ink having light reflectivity, and a coloring region colored by the coloring ink so as to be lined in such order from an inner side toward an outer side of the 3D object in an overlapping manner;
at the time of forming in the first surface decoration mode, the light reflective region is formed using the ink having light reflectivity and without using the transparent ink; and at the time of forming in the second surface decoration mode, the light reflective region is formed using the ink having light reflectivity and the transparent ink, wherein at the time of forming in the first surface decoration mode and at the time of forming in the second surface decoration mode, a representation of color having a sufficient thickness to represent a full color is obtained by a subtractive color mixing in which the light reflective region is formed on an inner side of the coloring region in an overlapping manner, and the light reflective region and the coloring region are formed in an overlapping manner.

* * * * *